(12) United States Patent
     Davison

(10) Patent No.: US 10,680,520 B2
(45) Date of Patent: Jun. 9, 2020

(54) I/O PROTECTED BUCK THEN BOOST OR BOOST THEN BUCK CONVERTER, WITH INTERLEAVING OPTION

(71) Applicant: Ronald S. Davison, San Diego, CA (US)

(72) Inventor: Ronald S. Davison, San Diego, CA (US)

( * ) Notice: Subject to any disclaimer, the term of this patent is extended or adjusted under 35 U.S.C. 154(b) by 0 days.

(21) Appl. No.: 16/413,394

(22) Filed: May 15, 2019

(65) Prior Publication Data

US 2019/0356227 A1   Nov. 21, 2019

Related U.S. Application Data

(60) Provisional application No. 62/673,248, filed on May 18, 2018.

(51) Int. Cl.
     *H02M 3/158*  (2006.01)
     *H02M 1/32*   (2007.01)
(52) U.S. Cl.
     CPC ........... *H02M 3/1582* (2013.01); *H02M 1/32* (2013.01); *H02M 3/1584* (2013.01)
(58) Field of Classification Search
     CPC ......... H02M 2003/1566; H02M 3/158; H02M 3/1582; H02M 1/32; H02M 3/156
     See application file for complete search history.

(56) References Cited

U.S. PATENT DOCUMENTS

| | | | |
|---|---|---|---|
| 2008/0001587 A1* | 1/2008 | Cremoux | H02M 3/1582 323/282 |
| 2011/0187336 A1* | 8/2011 | Wu | G05F 1/10 323/282 |
| 2014/0029147 A1* | 1/2014 | Kadirvel, III | H02J 7/0031 361/90 |

* cited by examiner

*Primary Examiner* — Gary L Laxton
(74) *Attorney, Agent, or Firm* — Continuum Law; Robert P. Cogan

(57) ABSTRACT

A DC/DC converter is embodied in a single integrated circuit (IC) and may comprise a book-boost converter or a buck then boost or boost then buck converter. A first protection switch is connected between a bus, or input, terminal and one side of the DC/DC converter circuit art. A second protection switch is connected between an energy storage, or output, terminal and an inductor which is coupled to another side of the DC/DC converter circuit. This IC comprises input and output protection switches for input reverse voltage protection and overvoltage protection from transients. Additionally, passive filters may be connected to an input of each protection transistor to absorb overvoltages, transients, and current inrushes. The structure may comprise a two quadrant converter. Another embodiment comprises a four-quadrant converter comprising a first and a second opposed to quadrant converter.

20 Claims, 31 Drawing Sheets

CURRENT DIRECTION FROM
STORAGE (OR SOURCE)

$+ \longrightarrow -$

BOOST TO ENERGY STORAGE
FROM SOURCE

|  | | |
|---|---|---|
| BOOST | | CHARGING STORAGE ✗ FIG. 8 |
| BUCK | FIG. 10 ✗ BUCK FROM STORAGE TO SYSTEM LOAD | |

FIG. 15

4 QUADRANT

BOTH DIFFERENT CURRENT DIRECTION WITH EITHER BOOSTING
OR BUCKING OF VOLTAGE IN EITHER DIRECTION

FOUR QUANDRANT BUCK BOOST WITH PROTECTION MEANS

I/O PROTECTED BUCK THEN BOOST OR BOOST THEN BUCK CONVERTER, WITH INTERLEAVING OPTION

CROSS REFERENCE TO RELATED APPLICATION

This patent application claims priority to U.S. Provisional Patent Application Ser. No. 62/673,248 filed May 18, 2018, which is incorporated herein by reference in its entirety.

FIELD

The present subject matter relates to a four quadrant buck then boost or boost then buck converter or a two quadrant buck-boost controller embodied in a single integrated circuit.

BACKGROUND

A buck then boost or boost then buck converter, both possible with the same controller, is a type of DC/DC converter whose output voltage may be either higher than or lower than the input voltage in order to meet the requirements of a particular application. The converter selectively operates in a step-down buck mode and in a step-up boost mode. Buck then boost or boost then buck converters regulate voltage in a wide variety of applications including consumer electronics, power amplifiers, self-regulating power supplies, and control applications. The design of a four quadrant buck-boost, or two quadrant, buck then boost or boost then buck converter is similar to a buck converter and boost converter, except that it is in a single circuit and it usually has an added control unit. The pulse width modulator (PWM) control units sense the level of output voltage and current passing through the control switch and regulates output voltage. Input voltage may also be used in the control loop. Input voltage is also used for enabling and disabling the PWM control loop. The control unit takes appropriate action to define circuit paths to produce the buck-boost effect. A buck-boost, buck then boost or boost then buck circuit allows bidirectional current and power and converts voltage in either direction, based on sensed inputs. A buck-boost converter is a four quadrant converter and can also be just a two quadrant converter, however in a buck-boost two quadrant implemented converter two switches of the four switches are not needed for pulse width modulation (PWM) operation in opposed quadrant two quadrant operation. Thus this two quadrant, buck then boost or boost then buck (either allowed, but not in one implementation) topology is more economical to implement than a four quadrant converter. A two quadrant converter only allows boosting in one direction and bucking in the other direction while allowing two directions of current flow. A buck-boost converter in either the input to output direction or the output to input direction can also buck or boost in either direction and allow current to flow in two or opposing directions.

The switching circuits for connection or commutation of current are directly coupled to input and output circuitry. An upstream or downstream fault, or a voltage transient coming from outside the protection switches of the IC can damage the IC. There is not adequate protection of the circuit within the buck-boost converter itself for over voltage protection of the IC and especially of the unprotected PWM switches. The protection means and PWM switches when external to the IC allow for higher currents and voltage withstand via component selection. When implemented inside the IC this is fixed at a static current and voltage level, based on the voltage and temperature limits of the IC.

In the prior art, where a single integrated circuit is used to embody a switch mode one, two, three or four quadrant converter, the switch mode regulator will be incomplete. In order to provide protection and other functions, external components are typically required. Where any current is consumed, the series switch connecting an input or output to a reservoir capacitor or energy storage means, not the PWM/pulse frequency modulation (PFM) dedicated switches, will comprise an external switch. External switches far from either the protection components or control units will create transients due to inductance designed in or must be dealt with such as cabling inductance increase the transient voltage levels beyond what normal system voltages and either separate protection means needs will increase (passive, active, or both). These components require space on a circuit board and additional expense in component cost, space, weight, and assembly. Transient voltages that may be caused by a distant external switch must be prevented from affecting other components in the circuit board. Transient protection shunt devices are also used when needed in conjunction with filters or active protection means to protect the system. These transient voltage devices have limitations in cycle life and voltage and current maximum limits. This may require larger filters for the shunt devices to have an acceptable lifetime of service. This still does not protect the TVS and downstream system in an extreme transient event, even if infrequent, because only one extreme transient is needed to cause failure. Filters take up space and have limitations and stability degradation of the converter, either limiting the filtering needed or forcing slowing down of control loops or both and thus degrade system performance especially stability and voltage compliance or sacrificing survivability limits. Protection means controlled by the combined protection and PWM/PFM controller and their close proximity to the IC allow elimination or reducing filters and shunt protection means.

Many systems using integrated circuits comprising pulse width modulator/pulse frequency modulator (PWM/PFM) converters require protection at the input or output of the integrated circuit (IC) from overvoltages from transients or improper applied voltage sources, including opposing polarity source relative to allowed voltage ranges of system and IC. Prior art voltage conversion ICs have not been designed to include the level of integration of voltage conversion and protection disclosed herein. Consequently, higher levels of protection had to be provided from separate ICs, or discrete (passive, active, or both included) component designs outside of the voltage conversion means. In space and airborne applications, even the weight of an IC and the supporting PWB area and mechanical support is significant. In addition there is a weight multiplier of the total system both in added structure weight and also fuel needed to provide propulsion for this added weight. The additional fuel that is required adds additional structure weight that increases the weight multiplier. Additional ICs or discrete circuits take additional area on a circuit board and require peripheral components. This space and the weight added reduces the efficiency via the added weight. This adds both capital cost to the power converter and the system it supports, but also operating cost due to lower efficiencies of added weight that requires higher fuel burn. Although the added weight is not a big a problem, the added capital costs in ground transportation applications is a problem, just as it is in space and air transportation. Also there is an increase in terms of cost in fixed products such as grid tied energy storage systems.

U.S. Pat. No. 8,415,933 discloses a buck or boost DC/DC converter which provides pulse width modulation (PWM) to determine the buck duty cycle or the boost duty cycle. In a switching circuit, first and second transistors control charging or discharging during a boost operation or buck operation. Another pair of transistors controls direction of power flow. The switching circuit is not configured to provide overvoltage protection. Additional circuitry in another IC must be used.

U.S. Pat. No. 4,736,151 discloses a bidirectional DC/DC converter. First and second power switches are provided for buck and boost operation. Charging capacitors and the transistor power switches are controlled by an integrated circuit. Because the integrated circuit is external to the switching circuits and charging capacitors, the converter is subject to the shortcomings of extra board space being required for discrete components.

U.S. Pat. No. 6,788,033 discloses a buck-boost converter in an integrated circuit. The integrated circuit does not include the required inductor. The discrete inductor is subject to noise and requires additional space on a printed circuit board.

U.S. Pat. No. 8,159,200 discloses an integrated circuit for use in a DC/DC converter. The circuit has to change connection of the inductor in order to account for different operating modes. A pulse width modulation circuit is not provided for commutation of switches.

SUMMARY

Briefly stated, in accordance with the present subject matter a DC/DC buck-boost converter is provided that has a single integrated circuit (IC) structure which combines buck and boost switching transistors and overvoltage protection. The entire buck-boost converter is embodied in a single integrated circuit. Additionally, the circuit provides for hot switching of power sources. This IC structure also comprises a two-quadrant converter providing translation of current to and from an energy storage device. One set of switches, capacitors, and the inductor are used for both buck and boost operation. This IC comprises input and output protection switches for input reverse voltage protection and overvoltage protection from transients. A buck-boost control circuit includes a buck transistor and a boost transistor. One transistor provides a series circuit and the other transistor commutates the series circuit. A control circuit sets a duty cycle.

If a specific systems requirement does not need boosting or bucking in the same direction, then a buck-boost is not necessary. If this is the case a 2 quadrant converter can be used. If a buck-boost, or a buck then boost or boost then buck converter needs input or output protection this topology is more economical and smaller in size for a given power and current level. With that said the novel claims of this combined protection topology with a PWM/PFM are realizable in a one quadrant (buck, boost) two quadrant, or four quadrant converter in terms of the protection means and switching protection means that are triggered by sensing. This patent application focuses with examples on the two quadrant converters explained herein. A person skilled in the art can infer the novel claims to one, three and four quadrant converters. One quadrant converter would use a subset of sensing to be realizable. A four quadrant converter also must have boost and buck control means, and needs two more switch control means. This multipurpose topology implementation begins to become so complex that the cost of only realizing a four quadrant input and output protection controller would add extra cost for those implementations that can be realized with a protected two quadrant converter topology, for those systems that do not need four quadrant operation.

Alternatively the four quadrant implementation can repurpose the unneeded PWM means on one side of the inductor so that they are the protection means with the caveat that the normally grounded PWM switch, in a four quadrant converter, is provided with a high side floating gate drive like the top pass PWM switch to allow it to be the dual switch counterpart of the top switch, or another output or input protection path for a redundant input source or output energy storage device.

The normally grounded, connected PWM switch from a 4 quadrant implementation would also need an inverter or the type of device would need to be of the opposing type of switch. An example of this would be the top switch being a N-channel device and the repurposed switch would need to be a P-channel device. This would negate the need for a multiplexed inverter inside the IC that would need to be provided for both a true four quadrant converter into this protected two quadrant converter. A means of converting PWM control to a continuous control voltage would also need to be implemented inside the IC or outside, for this repurposed $3^{rd}$ and $4^{th}$ PWM switch control means. This allows one IC to do either four quadrant, by reusing the $3^{rd}$ and $4^{th}$ PWM switch control means or the two 2 quadrant topologies with the repurposed protection switches that are not needed to be PWM modulated in a two quadrant converter. Since PWM speed is in general not required for the majority of implementations, an outside rectification (active or diode) RCD filtered in-switch control path can be used instead of including it in the IC. Or it can be included in the IC if speed is required for low SOA or voltage or current margin designs or very high power systems such as grid scale energy storage. This would be the four quadrant capable IC, and would allow a lower cost implementation 2 quadrant converter, with the least amount of complexity in one IC that does all possible topology possibilities. The two quadrant only capable IC will be the main focus of presenting the protection means with the voltage conversion means, for the purposes of describing the relevant aspects that combine voltage conversion with input and/or output protection.

A buck-boost circuit may be bidirectional and convert voltage and/or current in either the input to output direction or the output to input direction.

A two quadrant converter, either a boost then buck or buck then boost converts current in both directions. Boost then buck converter provides voltage translation upward in one direction and downward in the other direction. A buck then boost converter provides voltage translation downward in one direction and upward in the other direction. Both of these implementations are realizable with one IC and are ideal for energy storage systems.

The IC can be designed such that only the portions that require low impedance to the power rails being converted need to be designed to withstand higher voltages. This is done with proper voltage withstand of the switching devices and the control node of the switch means. Also the required spacing of any of these nodes in either the PWB and/or inside the IC must be present to provide protection of other nodes that are not high voltage or in the main conduction path of the protection and PWM/PFM switches. These floating switches must be allowed to float with any system voltage and any transients stacked on a system voltage. The protection switches protect from transients or incorrect voltages applied allowing the PWM switches to not have to be chosen to withstand worst case conditions such as transients.

This allows for higher efficiencies because the switching losses of the PWM/PFM switching means can have lower voltage withstand limits. Lower voltage withstand devices have lower conduction and switching losses that allow for higher efficiencies and/or higher system protection levels as needed by selection of devices that are used with the control methods provided by the IC. These are the pass elements as the ground connected can be ground referred. The input voltage needed to power the IC can be protected with high value resistance and/or impedances to drop and/or filter voltages static or dynamic, during startup, and protected internal voltages appropriate to power the IC. This can be the input source or just the input source for starting the IC into PWM mode. High voltage derived input power can be turned off after another source is provided to the IC voltage input to improve efficiency This can be provided by an isolated slave winding from the inductor, or from another low power rail if system voltages are too high without suffering efficiency losses from dropping resistors and voltage shunt protection means.

BRIEF DESCRIPTION OF THE DRAWINGS

FIG. 14 and FIG. 15 each illustrate an opposed quadrant converter that can be realized in one converter;

DETAILED DESCRIPTION

Figure 1:
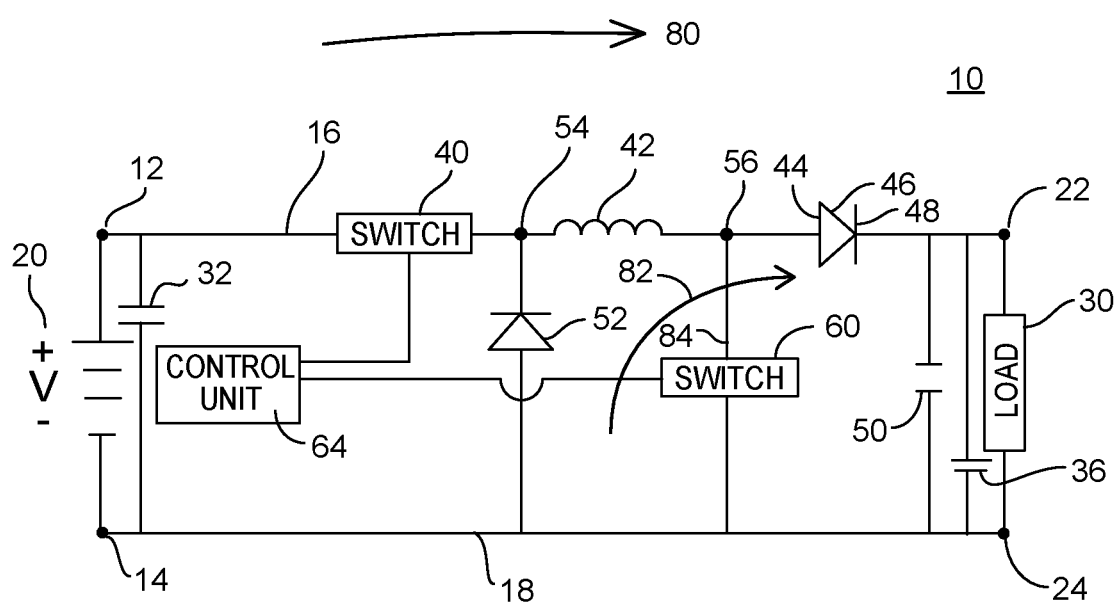
FIG. 1 is a schematic diagram of a prior art buck-boost converter.

The present subject matter provides new structure to significantly improve the efficiency and capability of buck-boost DC/DC converters. Input and output protection control, along with two power flow directions of the four quadrant or two-quadrant converter are provided. The present structure can be used on ground or air. The weight savings this solution provides, combined with an improved input protection, are particularly suited for aircraft deployment.

A buck-boost converter receives an input DC voltage and outputs a different level of DC voltage as required by the circuit it supplies. A buck-boost application is best explained in terms of a battery powered system. The charging source may have a higher voltage level than the level to which the system will be charged. The boost portion of the buck-boost converter is used to make the charging voltage greater than the charge level of an energy storage device. As the charge of the system reaches its capacity, there is a risk of the system overheating. The system monitors when the level of charge approaches capacity and invokes the buck function in order to lower the voltage gradually.

The energy storage device is often a battery. A battery voltage level can be either bucked or boosted or can also be both bucked and boosted. One example is battery level being boosted back to bus voltage. With a DC power source the voltage is typically bucked to a battery when charging.

Providing a DC/DC converter in a single integrated circuit (IC) rather than a plurality of integrated circuits is an important capability. Integrated circuit assembly is simplified. Significant problems inherent in chip to chip connections are minimized or eliminated. Circuit board "real estate" requirements are reduced. Noise sources in chip to chip connections are also minimized or eliminated. Structure is simplified in that only one reduced filter per input and output is needed to increase overvoltage protection capability. Built-in surge stoppers equivalents remove significant percentages of passive filter needs. Removal of IR losses as well as significant power converter weight are benefits. With input protection switch implementation and with a smaller input filter, protection up to 750 V. can be provided without external discrete components. With external discrete design protection levels can reach into several thousands of volts of voltage withstand.

The present subject matter comprises a unique integrated circuit chip. Also, external circuitry between input and output terminals cooperates with the integrated circuit to facilitate essential functions. This new structure allows a circuit board with one integrated circuit to replace a circuit board requiring a plurality of integrated circuit chips. This present subject matter with a single integrated circuit provides performance not previously achieved with a single IC. The subject IC provides input and output protection from damage due to overvoltage and reversed current. Also this IC provides pulse width modulation of buck or boost duty cycles in order to control power transfer. In addition this IC is bidirectional, enabling current and power flow to and from an energy storage component.

In one exemplary form of the DC/DC converter, switching components defining current paths, such as the power transistors and pulse width modulation transistors, are coupled to IC pins. In a buck mode a first N-channel MOSFET connects a voltage input to a charge pump via its source-drain circuit. A conduction path from an output pin could be subject to an uncontrolled reverse current condition. A second MOSFET is off and coupled to provide a current through its body diode. The circuit operates to turn off the first MOSFET and protects the first MOSFET.

The DC/DC converter further comprises an overvoltage sensing circuit to bias a first protection transistor to a nonconductive state in response to application of voltages to a bias terminal in excess of first protection transistor specifications. The DC/DC converter further comprises an overvoltage sensing circuit to bias a second protection transistor to a nonconductive state in response to application of voltages to an energy storage terminal in excess of second protection transistor specifications.

FIG. 1 is a schematic diagram of a prior art buck-boost converter 10. The prior art DC/DC converter is used to illustrate basic principles of directing power in a buck-boost converter. In this basic buck-boost converter 10 a positive input terminal 12 and a negative input terminal 14 are connected across a source 20 along a positive rail 16. With respect to DC voltages a rail is a boundary that a signal has to work within. A positive output terminal 22 and a negative output terminal 24 are connected across a load 30. The negative input terminal 14 and the negative output terminal 24 are connected by a negative rail 18. A first switch 40 is connected between the positive input terminal 12 and an inductor 42.

The DC/DC converter 10 is bidirectional. A first energy transfer direction proceeds from the input terminals 12 and 14 to the output terminals 22 and 24. A second energy transfer direction proceeds from the output terminals 22 and 24 to the input terminals 12 and 14. For purposes of the present description, even when energy transfer proceeds in the second direction, the names of the input terminals 12 and 14 and the output terminals 22 and 24 will remain the same.

A smoothing capacitor, namely an input capacitor 32, is connected across the input terminals 12 and 14. A smoothing capacitor, namely output capacitor 36 is connected in parallel with the output terminals 22 and 24. A series circuit is connected along the positive rail 16. The first switch 40, the inductor 42, and a diode 46 are connected in order between positive input terminal 12 and the positive output terminal 22. A first center node 54 is provided between the first switch 40 and the inductor 42. A second center node 56 is provided between the inductor 42 and the diode 46. A second switch 60 is connected between the second center node 56 and the negative rail 18.

The inductor 42 is connected to the anode 44 of a diode 46. The cathode 48 of the diode 46 is connected to the positive output terminal 22. A diode 52 has its anode connected to the negative rail 18 and its cathode connected to a terminal 54 between the first switch 40 and inductor 42.

A capacitor 36 is connected across the positive output terminal 22 and the negative output terminal 24. A second switch 60 has one terminal connected to the anode of the diode 44 and another terminal connected to the negative rail 18. A charging capacitor 50 is connected across the output terminals 22 and 24.

The first switch 40 and the second switch 60 are controlled by a control unit 64. The control unit 64 in one preferred embodiment is a pulse width modulator. The control unit 64 could also be an oscillator. The first and second switches 40 and 60 will preferably be metal oxide semiconductor field effect transistors (MOSFETs). For lower frequency applications, bipolar junction transistors (BJTs) may be preferred. The diodes 46 and 52 preferably have a low forward voltage and a high switching speed.

Consequences of turning the switches 40 and 60 on and off include the following. When power is directed in the first direction, a current >0 flows through the inductor 42. In the main direction, the DC/DC converter 10 is a buck converter, also referred to as step-down converter. When power flows in the second direction, the DC/DC converter 10 is a boost converter, also referred to as step-up converter.

Figure 2:
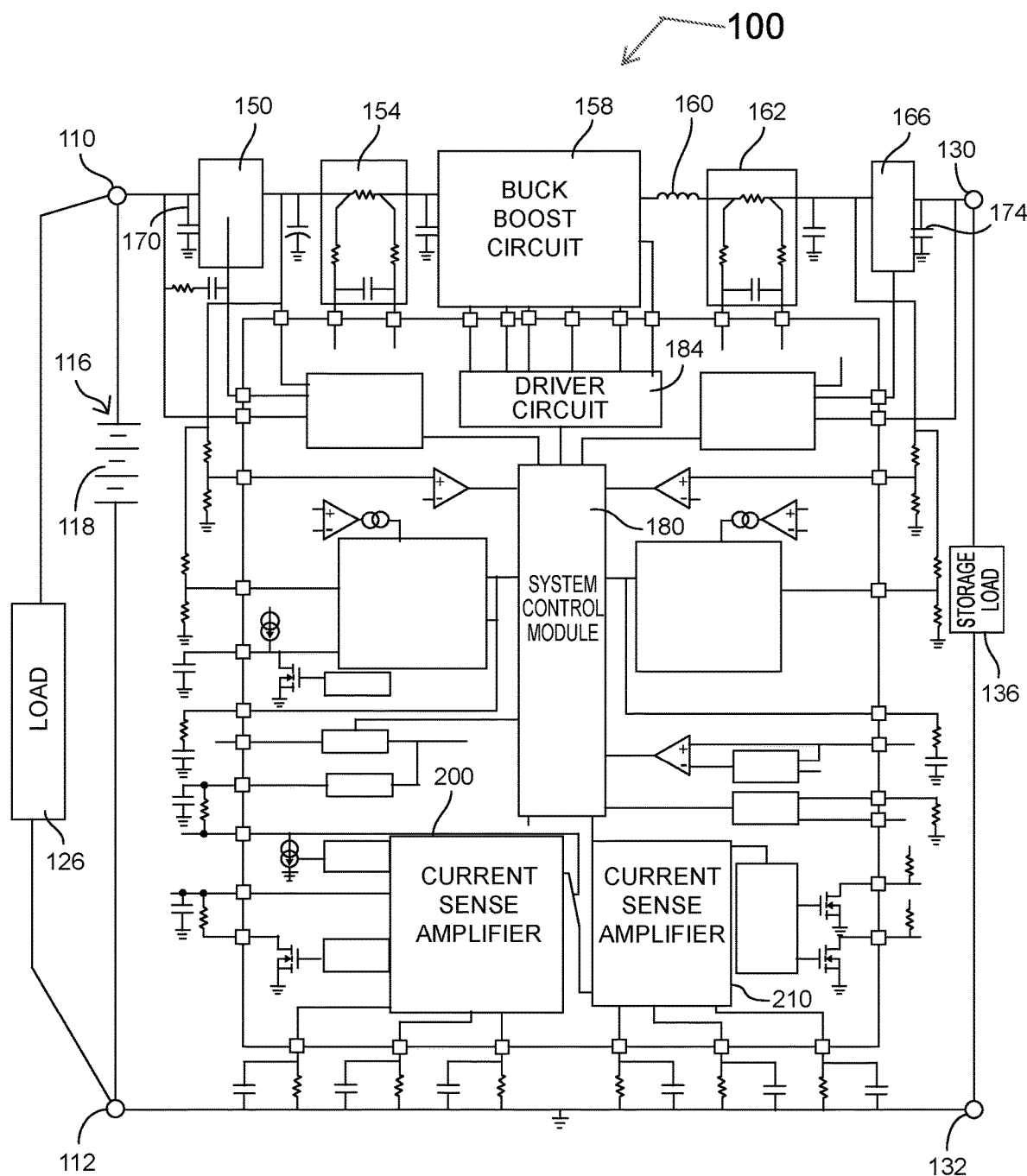
FIG. 2 is a block diagram of a DC/DC converter constructed in accordance with the present subject matter.

FIG. 2 is a block diagram of a DC/DC converter 100 constructed in accordance with the present subject matter. The DC/DC converter 100 maintains a voltage level across bus terminals comprising a positive bus terminal 110 and a negative, or ground, bus terminal 112. The bus terminals 110 and 112 are connected across a voltage source 116. In the present illustration, the voltage source 116 is a battery 118. The bus voltage powers a load 126. The load 126 may take many different forms. One example is an avionics package in an airborne application. An opposite side of the DC/DC converter 100 has a positive energy storage terminal 130 and a negative, or ground energy storage terminal 132. The energy storage terminals 130 and 132 are connected across a storage load 136 which, for example, could comprise a rechargeable battery. The storage load 136 is charged during a buck mode where current flows from the plus input terminal 110 to the energy storage terminal 130. When the bus voltage provided by voltage source 116 is interrupted or reduced, the storage load 136 supplies voltage across the bus terminals 110 and 112 in a boost mode.

Connected in series from the bus terminal 110 to the energy storage terminal 130 are a first protection switch 150, a first current sensing module 154, a buck-boost control circuit 158, an inductor 160, a second current sensing module 162, and a second protection switch 166. A first charging capacitor 170 is connected between the bus terminal 110 and ground. When bus power is turned on, the charging capacitor 170 receives inrush current and the first protection switch 150 is closed. The charging capacitor 170 protects the first protection switch 150 from overvoltage. A second charging capacitor 174 is connected between the energy storage terminal 130 and ground. In operation, the switch 150 protects the buck-boost control circuit 158 from overvoltage and from reverse polarities. An overvoltage could be due, for example, to lightning striking an aircraft and producing a transient spike. Similarly, the second protection switch 166 protects the buck-boost control circuit 158 from overvoltages applied at the energy storage terminal 130. The first and second protection switches are not switched when a protection function is not being performed.

The duty cycle circuit includes a first switch which provides a current path in a boost direction and a second switch which provides a current path in a buck direction. When the first switch is connected for providing a current path, the other switch, is connected to commutate the first switch. Similarly, when the second switch is connected for providing a current path, the first switch commutates conduction of the second switch. The duty cycle creates the degree of buck or boost provided. Switching of the switches in the buck-boost module 158 is controlled by a system control module 180. The system control module 180 provides switching signals to a driver circuit 184.

Inputs to the system control module 180 include feedback loops which compare current flow. The current flow is indicative of whether operation in the buck mode or the boost mode is required. The first current sensing module 154 contains a resistor in a network to provide an input indicative of current. The signal is coupled to a first current sense amplifier 200. A current signal is provided from the second current sensing module 162 to a second current sense amplifier 210. The DC/DC converter 100 senses when the voltage source 116 collapses. When this happens operation switches from the buck mode to the boost mode.

Figure 3:
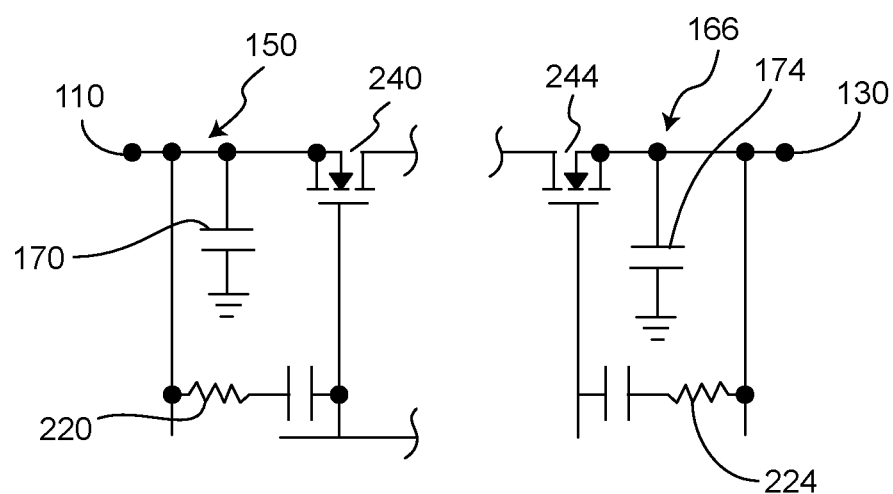
FIG. 3 is a partial detailed view of FIG. 2 illustrating a first protection switch and a second protection switch in schematic form.

FIG. 3 is a partial detailed view of FIG. 2 illustrating the first protection switch 150 and the second protection switch 166 in schematic form. Each of the switches 150, 166, and switches inside the buck-boost control circuit 158 (FIG. 2) are preferably n-channel metal oxide semiconductor field effect transistors (MOSFETs). MOSFETs are generally preferred over bipolar transistors due to MOSFETs switching characteristics. In high current applications, an insulated-gate bipolar transistor (IGBT) is used in place of a MOSFET. The IGBT is a three-terminal power semiconductor device primarily used as an electronic switch. The voltage drop across a MOSFET is generally a function of current. In a high current condition, a greater power loss occurs in the MOSFET. This power creates excess heat in the MOSFET which can lead to failure. The IGBT has a fixed voltage drop which at higher currents will produce less heat than would be produced in a MOSFET.

As seen in FIG. 3, the switch 150 comprises a first protection transistor 240 having a source connected to the positive bus terminal 110. The charging capacitor 170 is coupled between the terminal 110 and ground. The switch 166 comprises a second protection transistor 244. The source electrode of the second protection transistor 244 is connected to the energy storage terminal 130. The second charging capacitor 174 is connected between the energy storage terminal 130 and ground.

In one embodiment, a first passive filter network 220 is connected to the first protection transistor 240. The passive filter 220 dissipates power due to an overvoltage. Therefore, the level of the voltage that can be applied to the terminal 110 and still protect the first protection transistor 240 is increased. In one preferred embodiment the increases are on the order of hundreds of volts.

Figure 4:
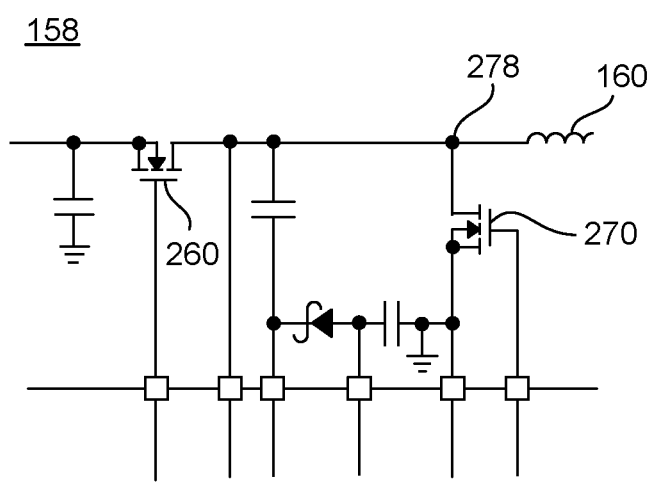
FIG. 4 is a partial detailed view of FIG. 2 illustrating the duty cycle circuit in schematic form.

The opposed two quadrant boost then buck DC/DC converter further comprises a second passive input filter 224 across the energy storage terminal and ground to absorb current, that when stopped by the opening switch, creates transients and overvoltages coupled to the second protection transistor 270 (FIG. 4). The capacitors in combination with the protection switch single or pair opening reduce the voltage transient caused by stopping current with the reactive elements included by design or by the unavoidable reactive elements of the physical layout and design, e.g., cable inductance.

FIG. 4 is a partial detailed view of FIG. 2 illustrating the buck-boost control circuit 158. As seen in FIG. 4, a buck control transistor 260 is coupled with its source-drain circuit in series between the first protection switch 150 in the first current module 154. A boost control transistor 270 is between a terminal 278 that is between the buck control transistor 260 and the inductor 160 and ground. The buck control transistor 260 is commutated at its gate electrode in a buck control loop. The boost control transistor 270 is commutated at its gate electrode in a boost control loop. In the buck mode the inductor 160 has current flow in the direction from the bus terminal 110.

Normally the circuit operates in the buck mode. The circuit senses failure of the source 116 and switches from the buck mode to the boost mode. When the integrated circuit senses return of the source 116, operation switches back to boost.

In the buck mode, the buck control transistor 260 provides for the series circuit that couples energy to the storage load 136 from the bus terminal 110. The boost control transistor 270 is operated by the system control module 180. The boost control transistor 270 commutates the buck control transistor 260. More specifically, the boost control transistor 270 is coupled to back bias the buck control transistor 260 to define the duty cycle. The cycle in this context is one cycle of the switching frequency provided by the system control module 180. In the present context, the duty cycle is the percentage of time of one cycle during which the buck control transistor 260 is turned on. In the boost mode, the second duty cycle transistor 270 provides a series path between the inductor 160 and ground in order to create a potential across the bus terminals 110 and 112. The buck control transistor 260 commutates the second duty cycle transistor 270.

In the boost mode, the charging capacitor 170 is charged to a higher voltage than is provided by the storage load 136. This higher voltage is provided by the inductor 160. In one illustrative situation, Vin, i.e., the voltage across the terminals 110 and 112, is 10 V. If voltage across the inductor 160 is 20 V, the duty cycle determines what percentage of the inductor voltage gets added to Vin. For example, a duty cycle of 25% will add 25%×20 V, or 5 V to the potential at terminal 110. A duty cycle of 50% will add 50%×20 V, or 10 V. The feedback circuit calculates error between a required voltage and an actual bus voltage. The system control module 180 operates the duty cycle module 158 to provide a duty cycle proportional to the error.

The embodiment of FIG. 2 comprises a two quadrant DC/DC converter. The current paths provide a half bridge. In a four-quadrant DC/DC converter, a full H bridge is used. A four-quadrant converter allows buck current or boost current to flow in either direction so that voltage could be raised across the terminals 130 and 132 in relation to the voltage across the terminals 110 and 112. Voltage could be lowered across the terminals 110 and 112 in relation to the voltage across the energy storage terminals 130 and 132.

Figure 5:
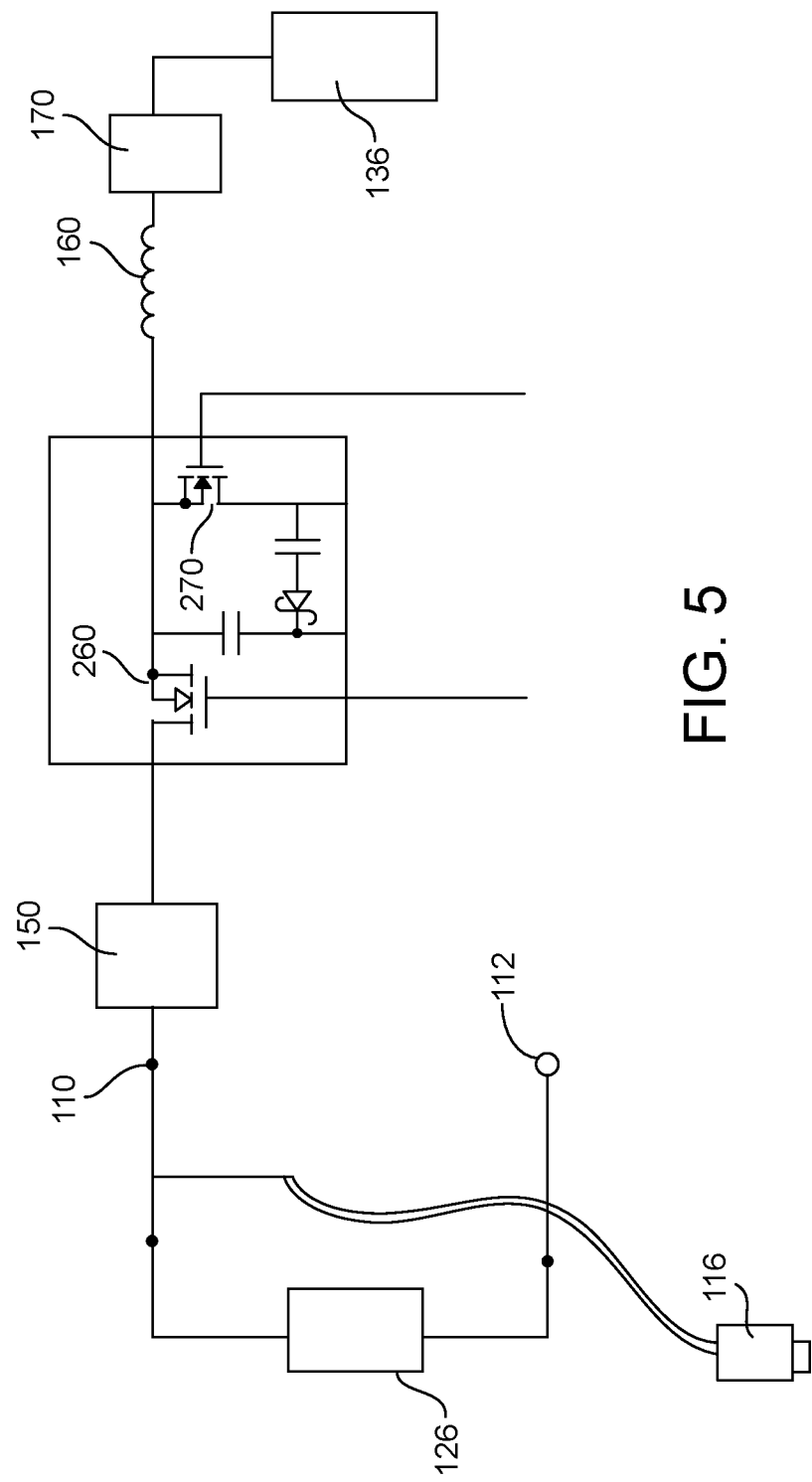
FIG. 5 is an illustration of an embodiment embodying hot switching.

FIG. 5 is an illustration of the circuit for maintaining current flow when a bus source fails. This switching arrangement also permits "hot switching" of the source 116. The term cold switching indicates that a switch is activated with no signal applied. In hot switching, voltage is present and current will flow immediately once contacts close. When the switch is opened, this current will be interrupted and may be directed through an alternative path. Hot switching permits operation of the load 126 (FIG. 2) to continue uninterruptedly. It is not necessary to turn devices off across the terminals 110 and 112 to rewire a source across the terminals 110 and 112.

In FIG. 5 bus voltage is provided from the source 116 which may include a USB plug. Should a user inadvertently yank the USB plug out of a source such as a computer, the boost mode will be initiated. Current will be provided from the inductor 160 in order to boost the voltage across the source 116. Consequently hot switching is achieved.

The DC/DC converter provides a current path to facilitate hot switching across the bus terminals in transitioning from the boost mode to the buck mode. This active switching without pause is not trivial or a perfect transition, because a control loop must converge to a steady state to be stable in the steady state. This switching transition is not by definition steady state. The switched-in control loop will have a finite response, just like a load or input step change produces when one control loop gets switched out and the other gets switched in. Filter capacitors need to be sized to provide the needed voltage compliance for the controlled voltage node of the loop.

In the prior art, separate integrated circuits have been used to provide the switches 150 and 166 (FIG. 3) in order to cooperate with a duty cycle circuit in a DC/DC converter integrated circuit. The current circuit arrangement permits providing all of the above functions in a single integrated circuit. This greatly reduces cost, manufacturing complexity, and concerns due to noise which can affect integrated circuit to integrated circuit connections. Additionally, the necessary "real estate" on a circuit board for the DC/DC converter is reduced. This is significant because space on a circuit board is almost invariably at a premium. Consequently, the present subject matter satisfies a need which has not been met by prior integrated circuits.

Figure 6:
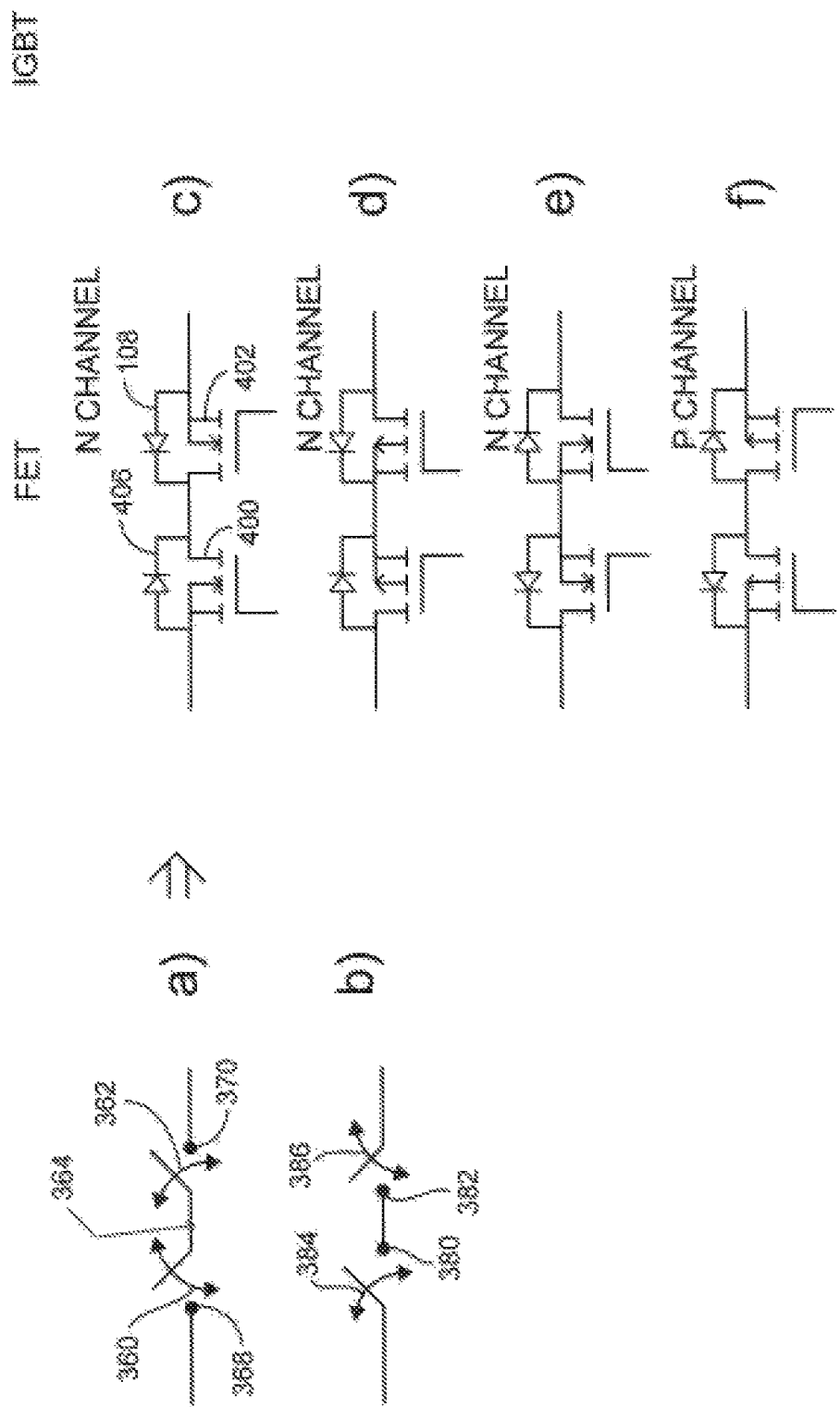
FIG. 6 is a schematic illustration of a pair of MOSFETs connected as first and second single pole, single throw switches.

FIG. 6 is a schematic illustration of a pair of MOSFETs connected as first and second single pole, single throw switches. In FIG. 6*a*, first and second switches 360 and 362 have a common terminal 364. Each switch 360 and 362 can be closed to a respective terminal 368 and 370 to complete a circuit. In FIG. 6*b*, first and second terminals 380 and 382 are connected in series. Switches 384 and 386 are each connected to a series circuit. The switches 384 and 386 are not connected to a common terminal when they are open. The switches 384 and 386 are closed to complete a series circuit. FIG. 6*c* illustrates the circuit of FIG. 6*a* constructed with a first MOSFET 400 and a second MOSFET 402. The MOSFETs 400 and 402 act as the switches 360 and 362 respectively.

FIGS. 7 through 12 illustrate current flow in the buck mode and the boost mode. Each mode comprises an operating cycle. The control transistor for the mode is on for the percentage of the operating cycle comprising the duty cycle and off for the remainder of the operating cycle. A first condition in each mode is a charging operation. The charging operation includes a first current path when the mode control transistor is on and another path when the mode control transistor is off. A second operating condition is the discharge operation. Current paths change as the mode control transistor is commutated. In a third operating condition, voltage across the input terminal 110 and ground and the voltage across the energy storage terminal 130 and ground are substantially in equilibrium. The inductor 160 is charged during the buck mode and provides energy to boost voltage at the terminal 110 when bus voltage is lost. The inductor 160 also provides current flow in a direction corresponding to the conductive state of the buck and boost transistors 260 and 270.

Figure 7:
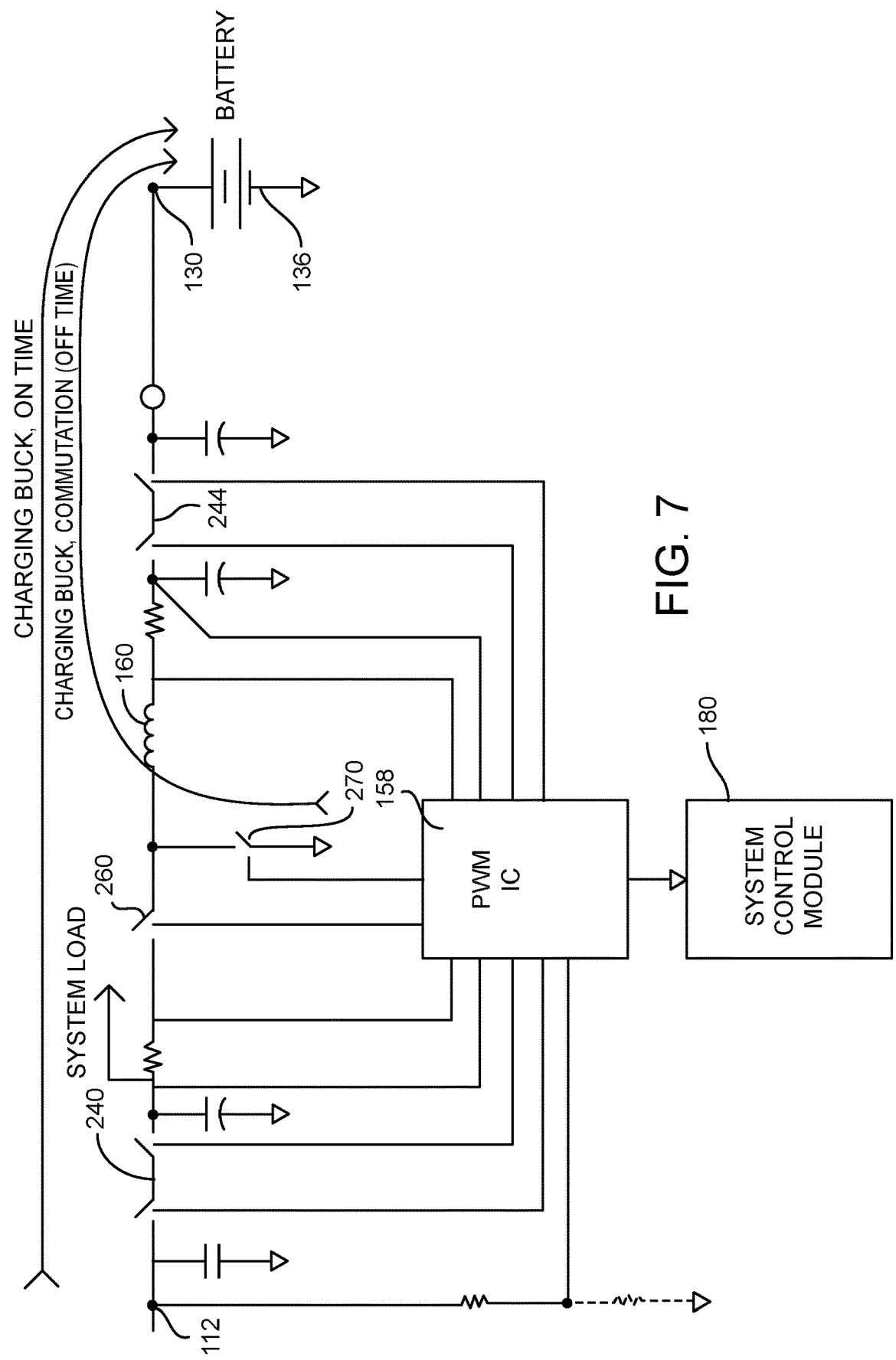
FIG. 7 illustrates a single implementation having two modes or quadrants of operation with buck to energy storage charging.

FIG. 7 illustrates current flows in the buck mode when the storage load 136 (FIG. 2) is being charged. When the buck transistor 260 is on, current flows from the input terminal 112 to the energy storage terminal 130. When the boost transistor 270 is on, current flows from the inductor 160 to the energy storage terminal 130 as indicated in the dashed line in FIG. 7. When the boost transistor 270 is off, current flows from an opposite side of the inductor 160 to the energy storage terminal 130 for commutation of the boost transistor 270. The system control module 180 commands opening and closing of switches.

Figure 8:
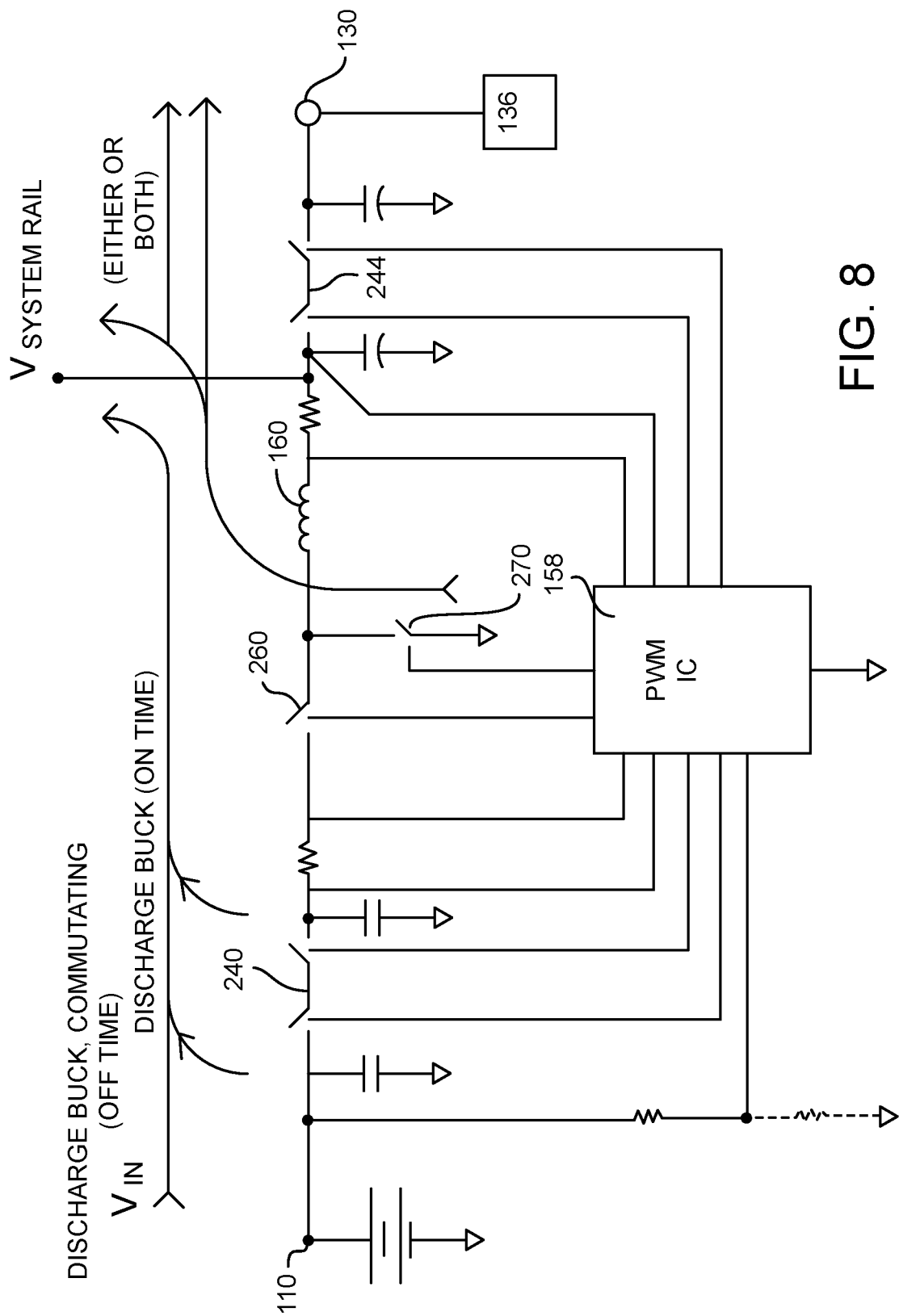
FIG. 8 illustrates the DC/DC converter in the buck mode when charging the energy storage device.

FIG. 8 illustrates current flow when the storage load 136 is being discharged. Current flows from the positive input terminal 112 through the first protection resistor 240 along the V system rail between the positive input terminal 110 and the energy storage terminal 130. For the off portion of a duty cycle, current comes from the system control module 180 (FIG. 7) to commutate the buck transistor 260 to which Vin is connected.

Figure 9:
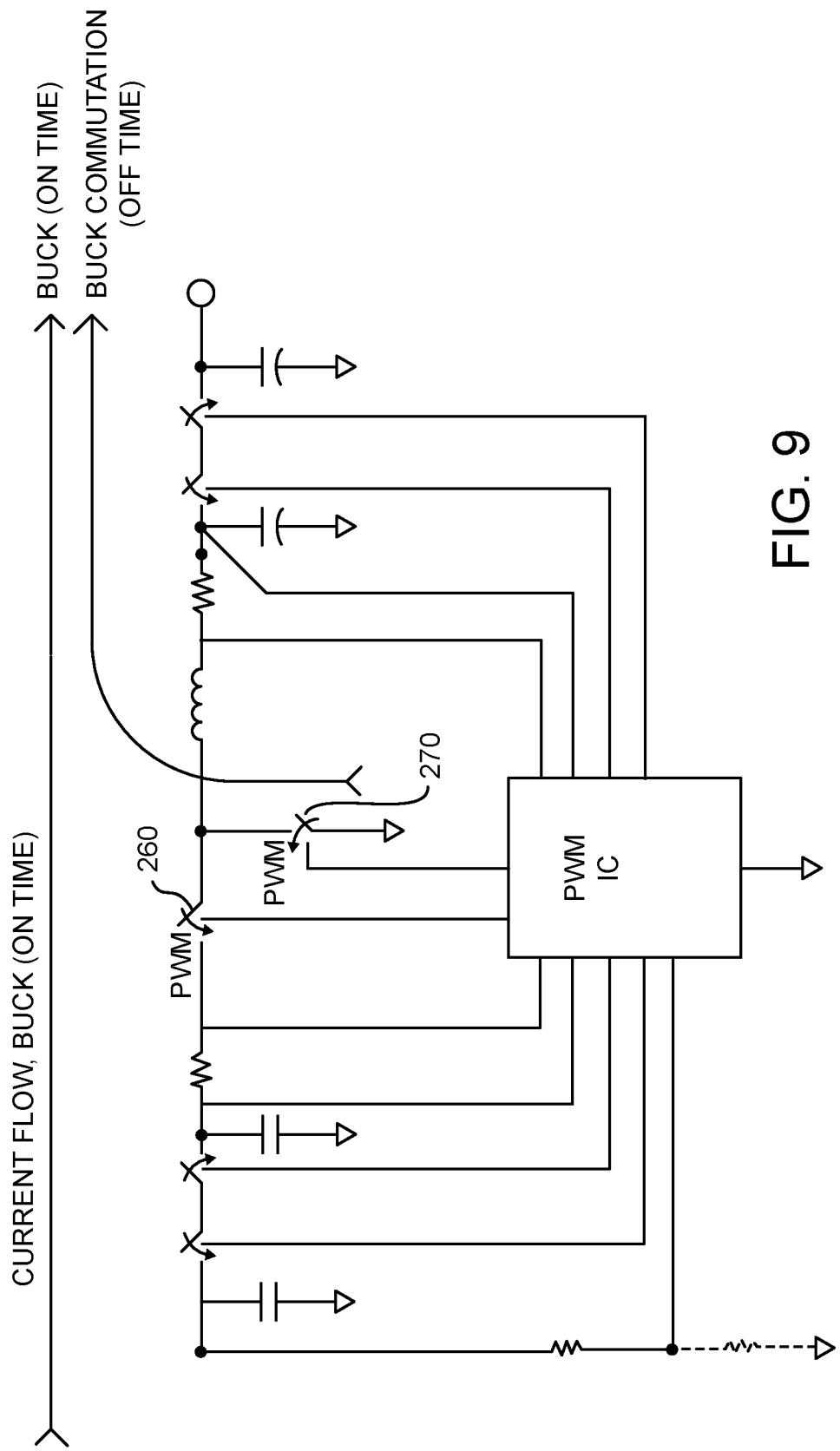
FIG. 9 illustrates commutation of switches in the buck mode.

FIG. 9 illustrates commutation of the buck and boost transistors 260 and 270 to maintain duty cycles. In FIG. 9, the arcs through each transistor demonstrate closing of transistors during the on time of the buck transistor 260. In the buck mode, buck transistor 260 provides a series circuit which is commutated on and off by the boost transistor 270. This represents the equilibrium condition.

Figure 10:
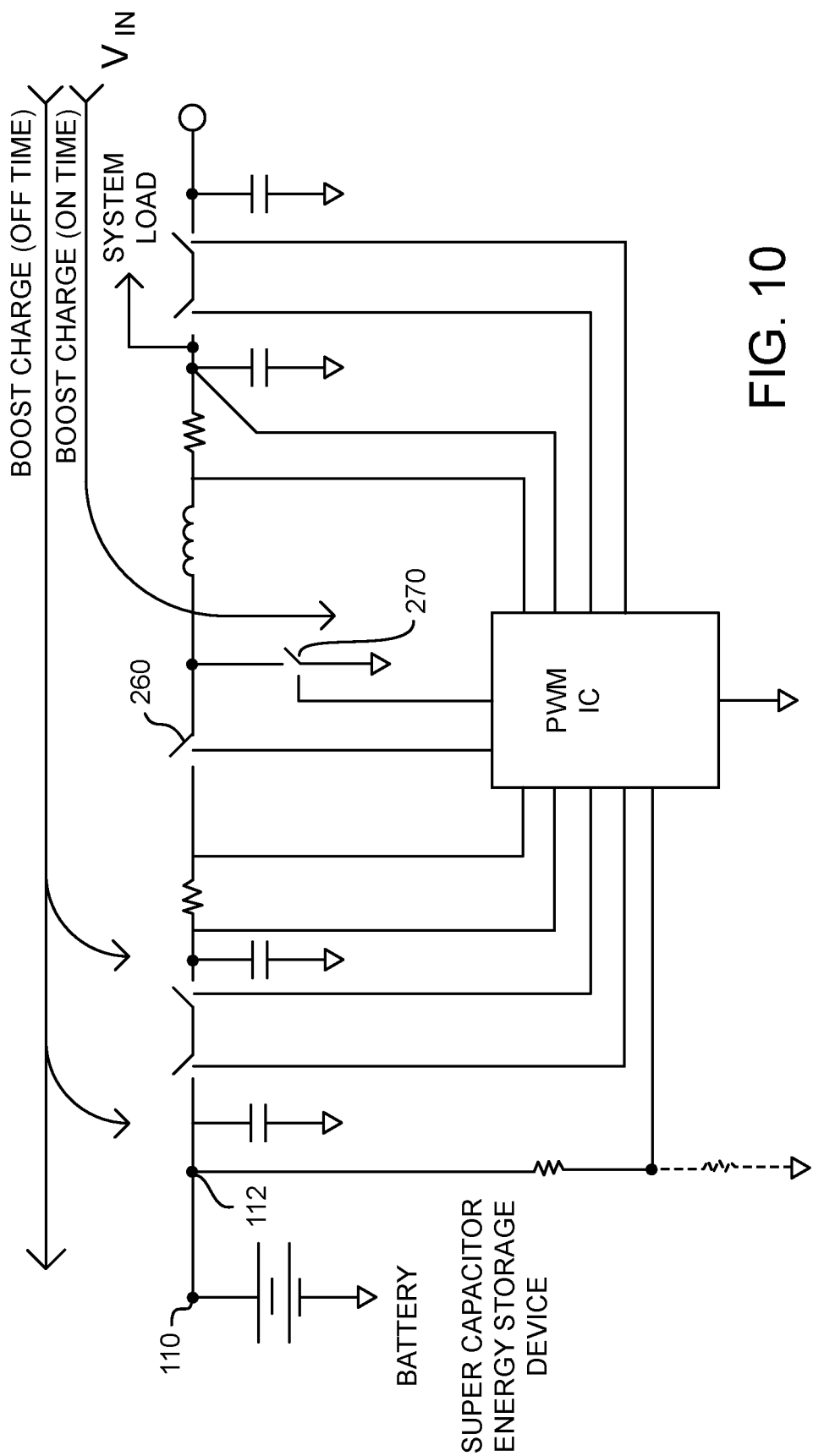
FIG. 10 illustrates the DC/DC converter in a boost mode boosting power from the energy storage device in a discharge mode.
Figure 11:
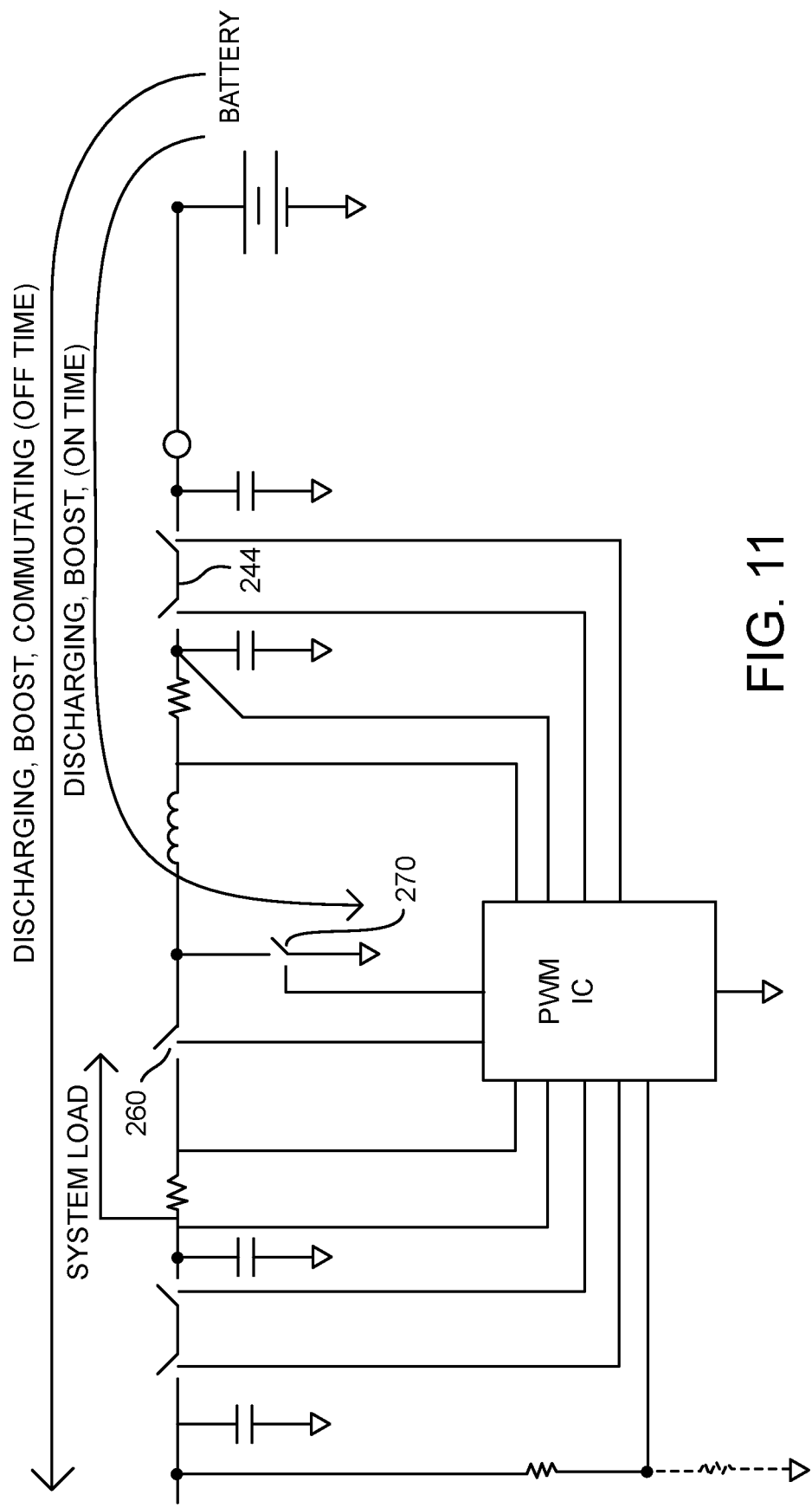
FIG. 11 illustrates the DC/DC converter in the boost mode when discharging the energy storage device.

FIGS. 7 and 11, battery shown on right, are a single IC implementation each showing the two modes or quadrants of operation. FIG. 7 is buck to energy storage charge. FIG. 11 is boost from energy storage discharge mode. FIGS. 8 and 10, battery shown on left, are a single implementation each showing the two modes or quadrants of operation. FIG. 8 is buck to energy storage charge. FIG. 10 is boost from energy storage discharge mode.

FIG. 10 illustrates the DC/DC converter 100 in a boost mode boosting power from the energy storage device 136 (FIG. 8). In the boost mode, when the boost transistor 270 is on current flows through the boost transistor 270. When the boost transistor 270 is off, a current path is provided from the energy storage terminal 130 to the positive input terminal 112. In the boost mode, boost transistor 270 provides a series circuit which is commutated on and off by the buck transistor 260. This represents the boost charging mode.

FIG. 11 illustrates the DC/DC converter in the boost mode when discharging the energy storage device 136. The boost transistor 270 provides a series circuit and is commutated by the buck transistor 260. The battery 136 provides a potential across the terminals 110 and 112. When the boost transistor 270 is turned off, the series circuit from the energy storage terminal 130 to the positive input terminal 110 is closed. This represents the boost discharging mode.

Figure 12:
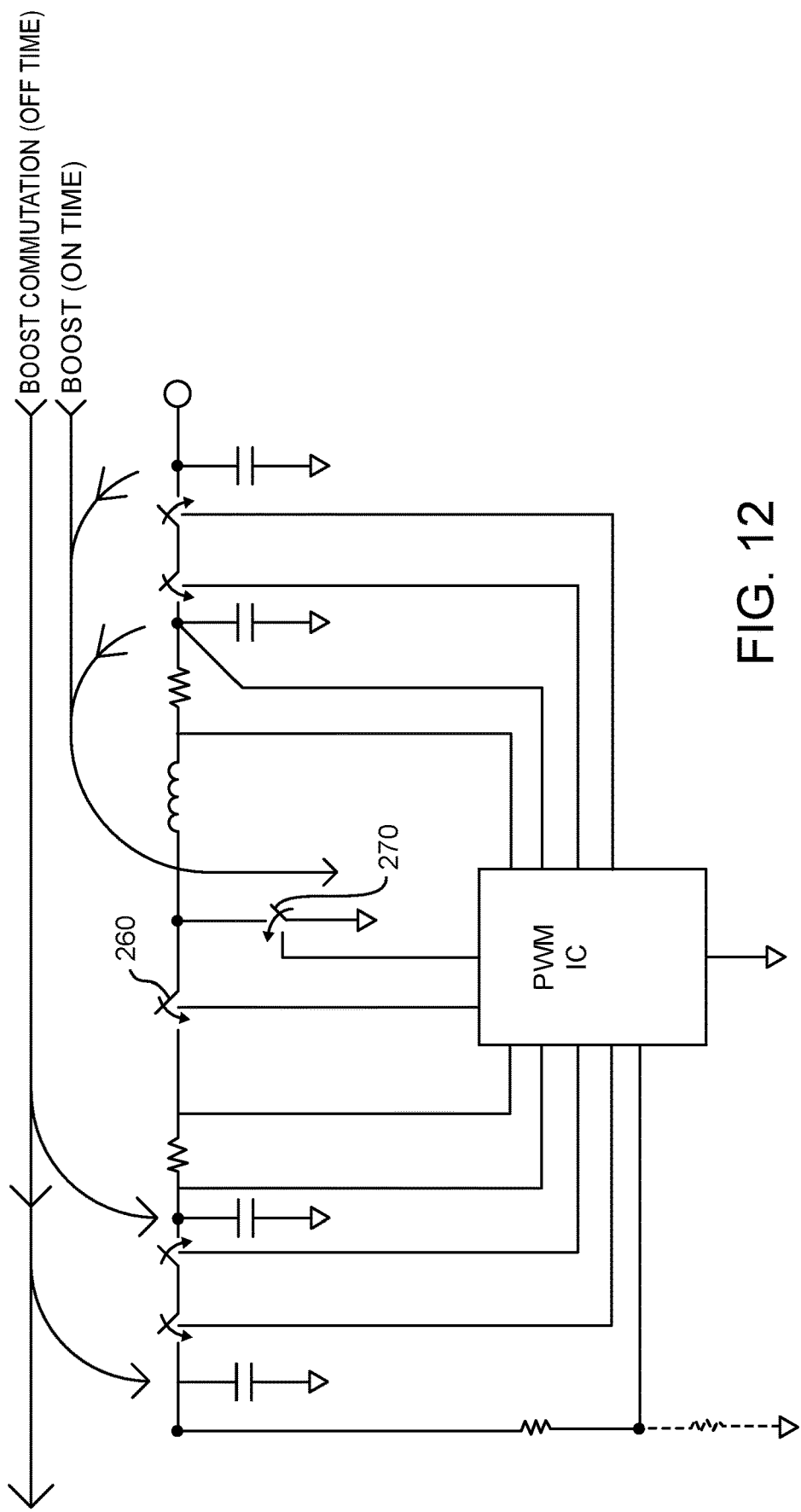
FIG. 12 illustrates commutation of switches in the boost mode.

FIG. 12 illustrates commutation of switches in the boost mode in the equilibrium condition. The arcs on each switch are closed during on time of the boost transistor 270. In the off portion of the boost duty cycle, current flows from the energy storage load 136 to the positive input terminal 110. Consequently, a substantially constant and correct voltage is maintained across the terminals 110 and 112 to operate the device 126.

The figures below review a sampling of alternative embodiments. The unexpected aspects of the present subject matter are also applicable in the context of 3 and 4 quadrant operation. This structure allows optimization of capability versus cost. Cost may be measured in terms of money, physical requirements, and speed. The novel aspects of combining protection switches are applicable in the context of a wide variety of converters. This includes 1 quadrant converters, 2 opposed quadrant converters, and 3 and 4 quadrant converters. A 3 quadrant converter is a 4 quadrant converter that prohibits one quadrant of operation yet needs all the parts of a 4 quadrant converter. However, the static quadrant does not need a switching optimized switch.

Figure 13:
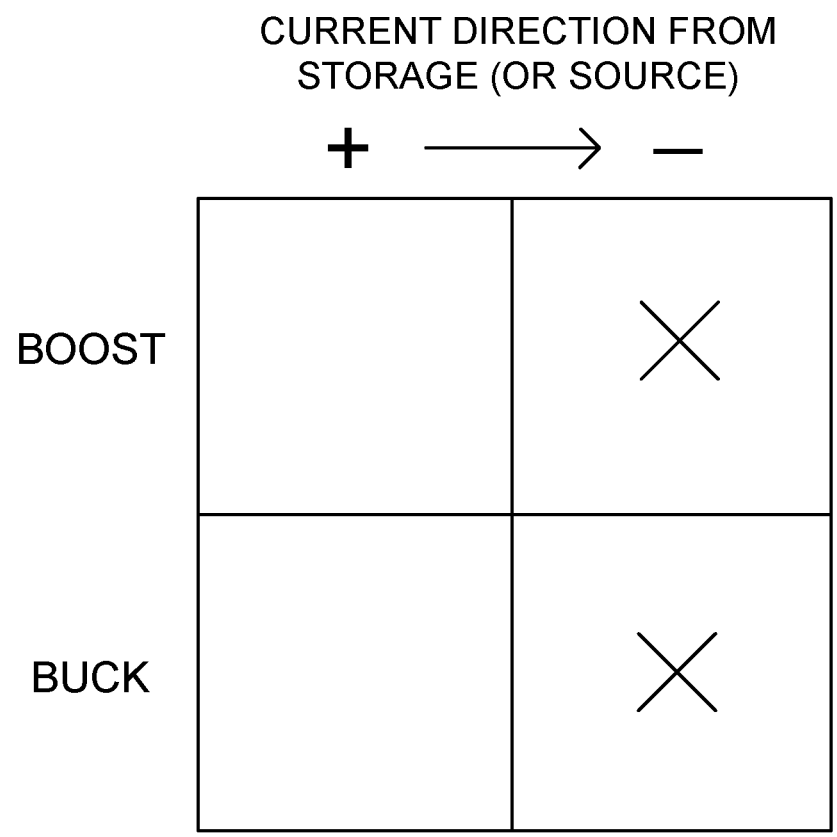
FIG. 13 shows a prior non-opposed 2 quadrant converter.

FIG. 13 shows a prior non-opposed 2 quadrant converter. This is not an opposed two quadrant converter and thus does not provide a means of charging a storage device, only discharging of an energy source in buck or boost mode. This is in contrast to opposed two quadrant converters. FIG. 13 is an example of input or output multiplexing. The present subject matter could include multiplexing.

Figure 14:
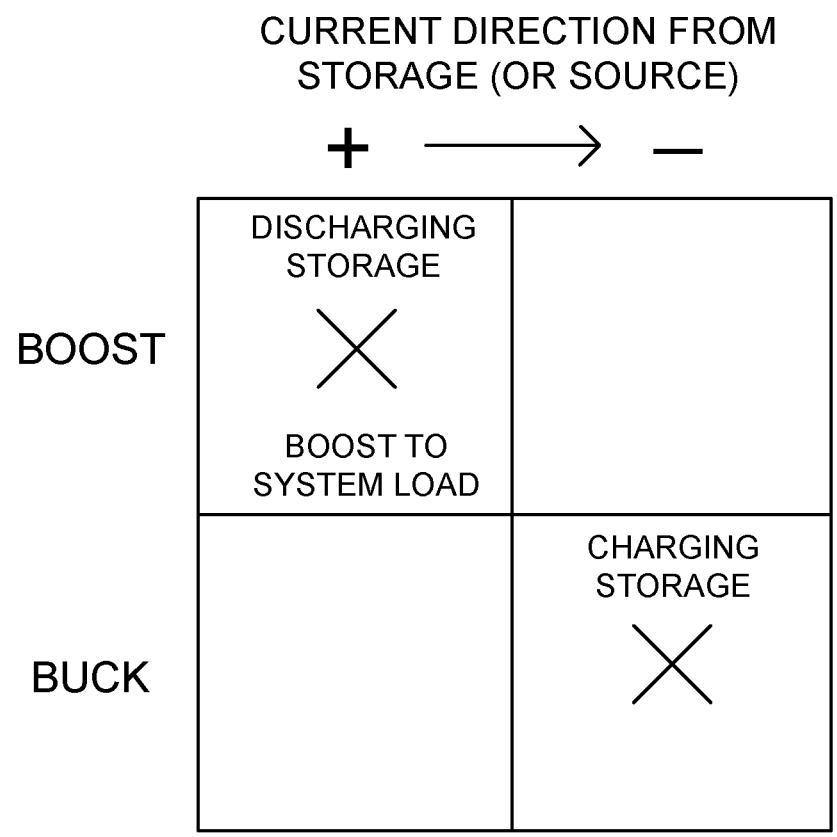

FIG. 14 and FIG. 15 each illustrate an opposed quadrant converter that can be realized in one converter that can cover all four quadrants, but which may be limited to only two quadrants in a particular implementation. If IFF bidirectional protection switches are included and their controls as well then a single control device can be realized that allows configuring the embodiments of FIGS. 7, 11, and 14 and the topologies of FIGS. 8, 10, and 15.

This expands the value of the design and potential market that can be served because the potential topologies that are possible in one solution can provide when bidirectional switching is included in one control IC. There is a very large system risk of splitting control functions between two or more IC's. This is called unintended contention and in some circumstances cannot be designed out. This becomes very complex to hardware and/or software design with an adequate margin of success. Thus a single IC that can be designed to house this appropriate control has advantages in system survivability, system analysis confidence, and system minimum function pass criteria. Thus this single housed control of the system, with protection means allow the appropriate IC to have control in both the two potential topologies possible in an opposed two quadrant topology with the minimum system risk of contention.

The limitation is that it cannot provide input and output multiplexing to provide four quadrant operation without additional multiplexing. This is not a disadvantage if not needed or required, thus a cheaper implementation is possible when only two quadrant operation is required. So a multiplexed opposed two quadrant converter to realize a 4 quadrant converter is not focused on herein, but is realizable at a cost. However this outside switched multiplexing with only two PWM switches may not be as cost effective just in switch count compared to said buck boost 4 quadrant 4 PWM/PFM example provided in FIG. 29.

When the energy source is bidirectional but the mode is discharge for transportation needs, two quadrant allowed topologies, in FIGS. 14 and 15, with one IC can be realized. In discharge mode there is a motor load. In regeneration mode the motor is a generator and charges the battery in both the possible topologies.

When the battery 136 is being charged outside of regeneration mode the motor can be replaced with the charging source. Since the controller provides charging means this function does not need to be in the charging source. Thus a simple energy source can be used without charge control means included. This can be a mechanical interlock that needs no control method and disconnects the motor and inserts the charging path at the charge port plug in. Any external means of providing disconnect of motor and inserting charging source will work with the protected opposed two quadrant or protected, 4 quadrant converter seamlessly. Thus motor/generator disconnect and charge insertion does not need to be solved with the controller design, allowing the lowest cost implementation with the same generalized topologies shown in quadrant diagrams shown in FIGS. 14 and 15. It could be electronically switched and is realizable but not focused on herein. Other means can be devised but the example provides the minimum complexity to provide said opposed two quadrant operations.

Figure 16:
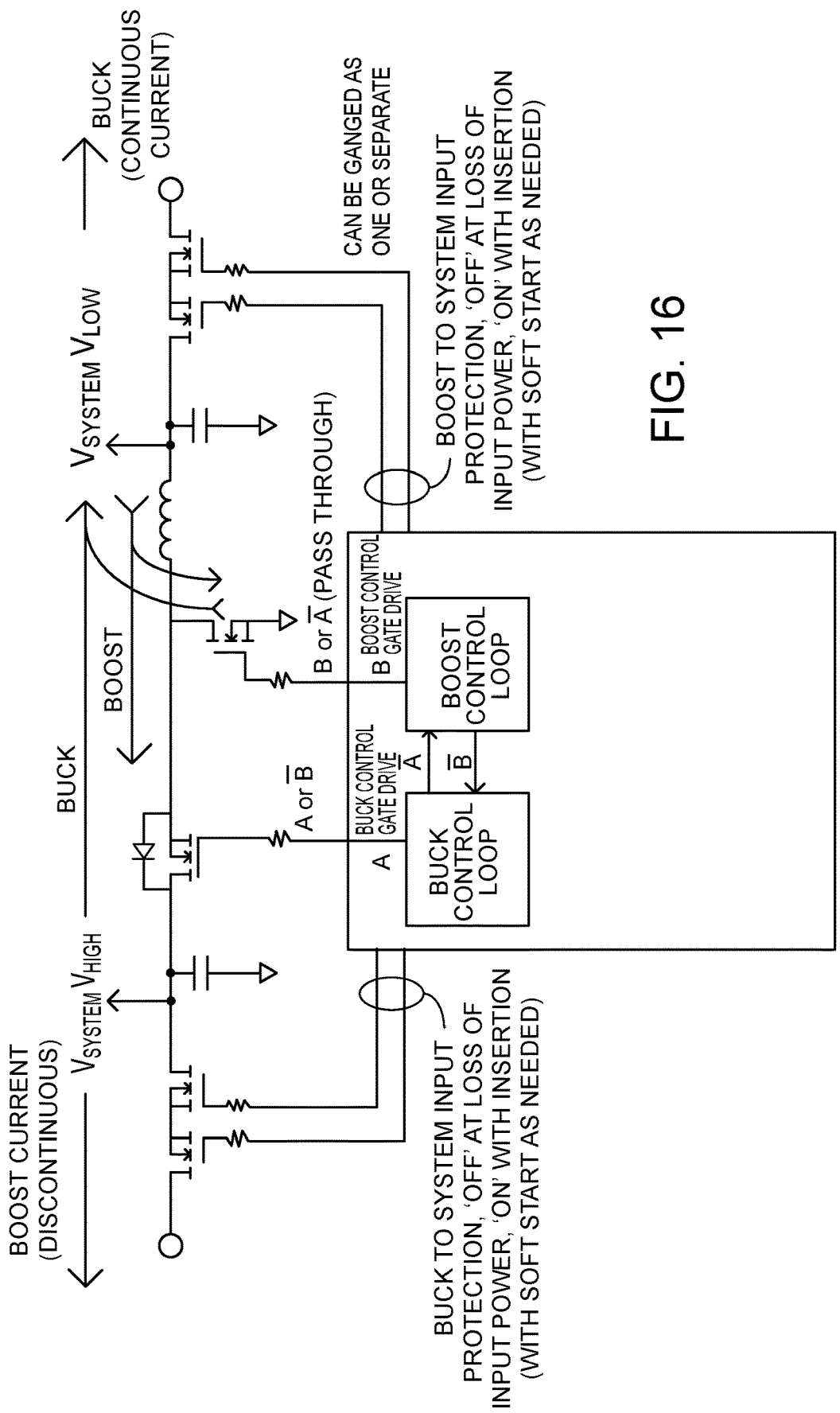
FIG. 16 illustrates a bidirectional buck and boost connection to control buck and boost sub blocks.

FIG. 16 illustrates a bidirectional buck and boost connection to control buck and boost sub blocks.

Figure 17:
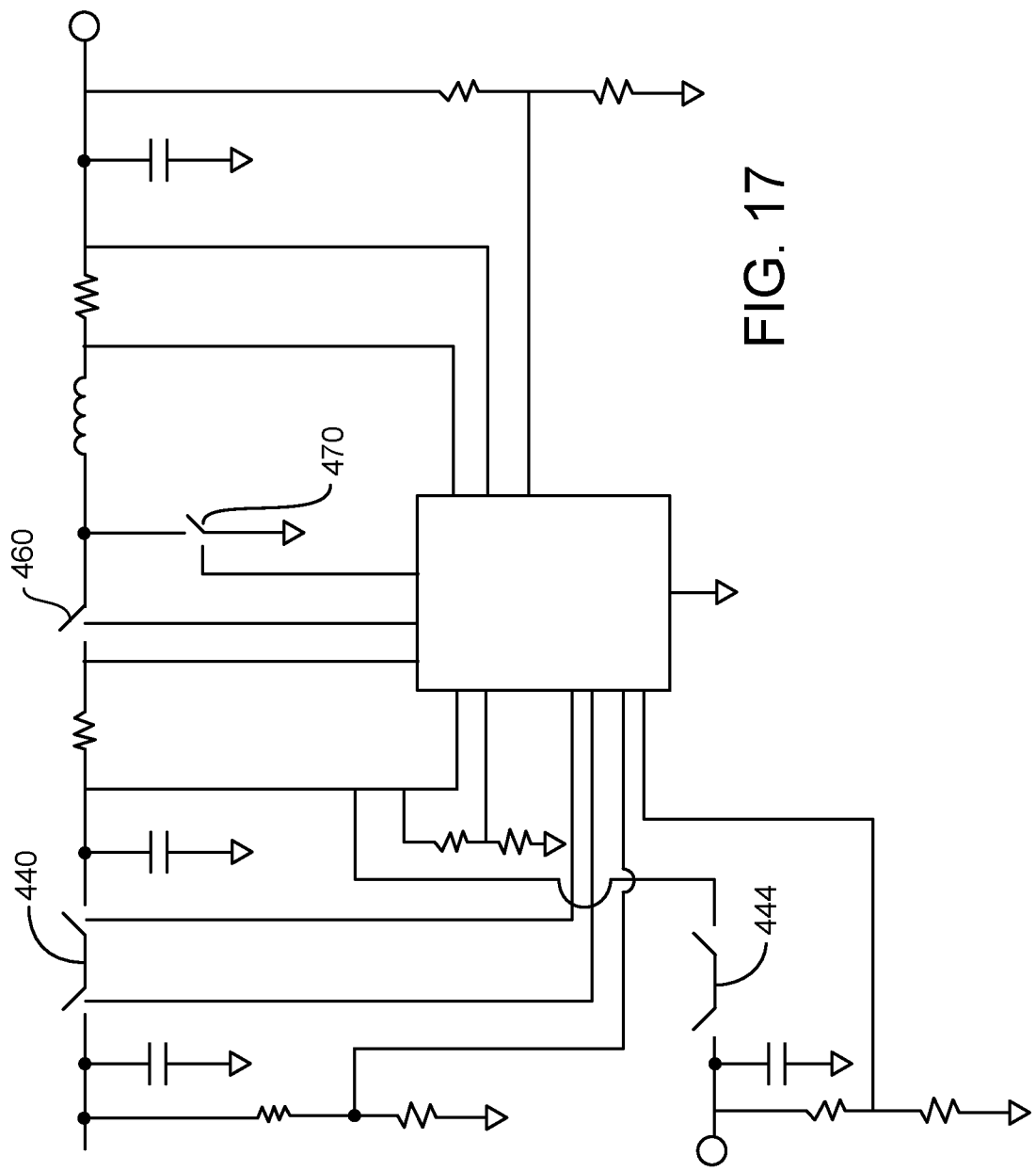
FIG. 17 illustrates an embodiment in which a second protection switch is repurposed in a different operating mode to provide a function of a first protection switch.

FIG. 17 illustrates an embodiment in which a second protection switch is repurposed in a different operating mode to provide a function of a first protection switch 440 When appropriate the system rails can be provided as shown in the FIGS. 7, 8, and 10. FIGS. 7 and 10 have the system rails added. This is a protected node from external connections via protection switches 240 at protected side of 240 in FIGS. 7 and 244 on FIG. 8. This is on the internal node inside protection switch 244.

FIG. 17 shows the possible repurposing of the second protection means 444 to the 1st protection means side. This allows for yet another topology with said dual, bidirectional switch protection, opposed two quadrant converter. This allows for redundant inputs connected to switches 440 and 444. This structure allows for interleaving of said inputs with protection switches providing interleaving of redundant inputs.

Figure 18:
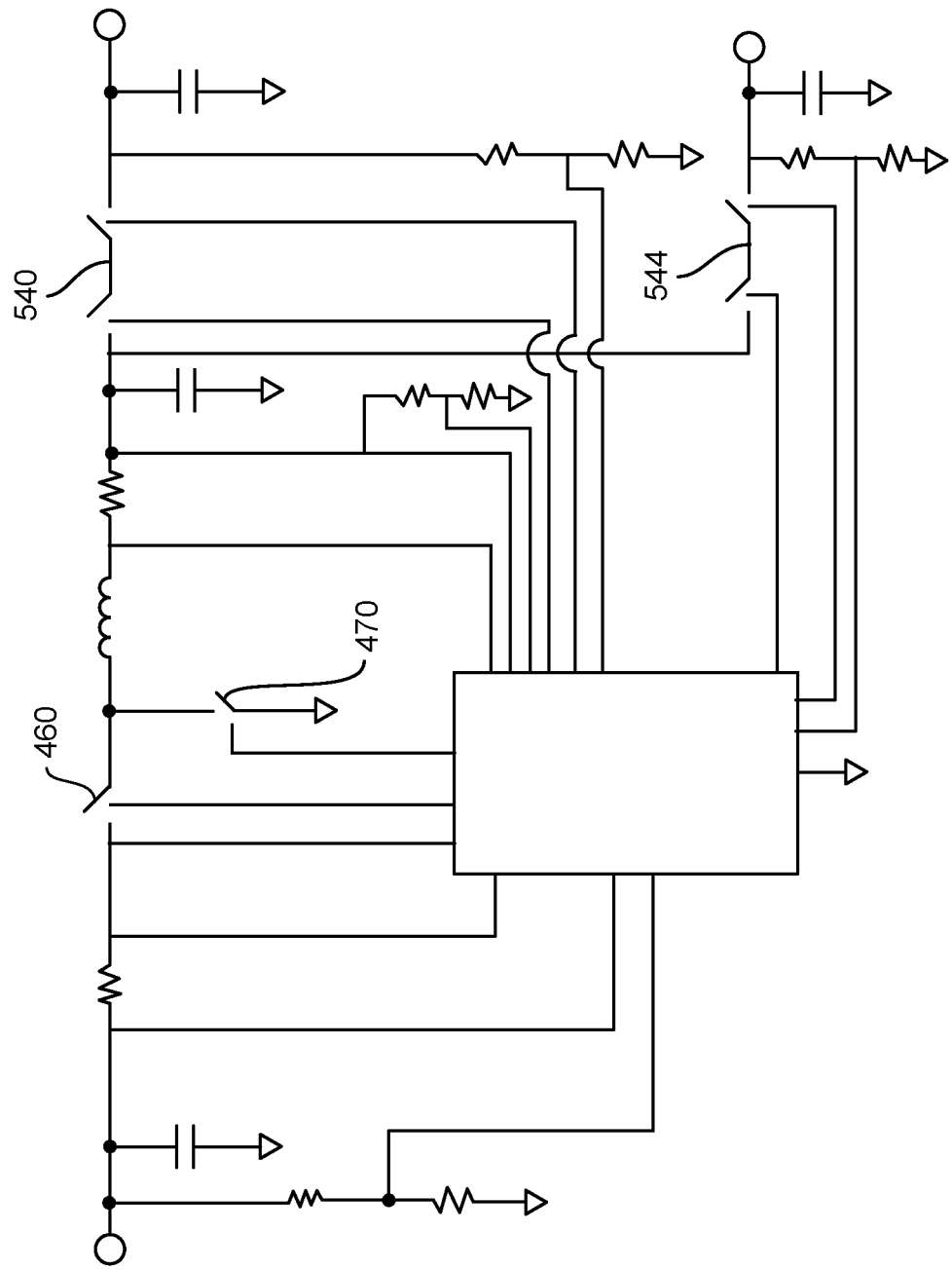
FIG. 18 shows a two input source protection boosting embodiment.

FIG. 18 shows a two input source protection boosting embodiment. Two or more energy storage means provide redundancy. FIG. 18 shows a two input source protection boosting, the dual. FIG. 18 has the exact same possibilities but switches buck to storage with boost to storage.

Figure 19:
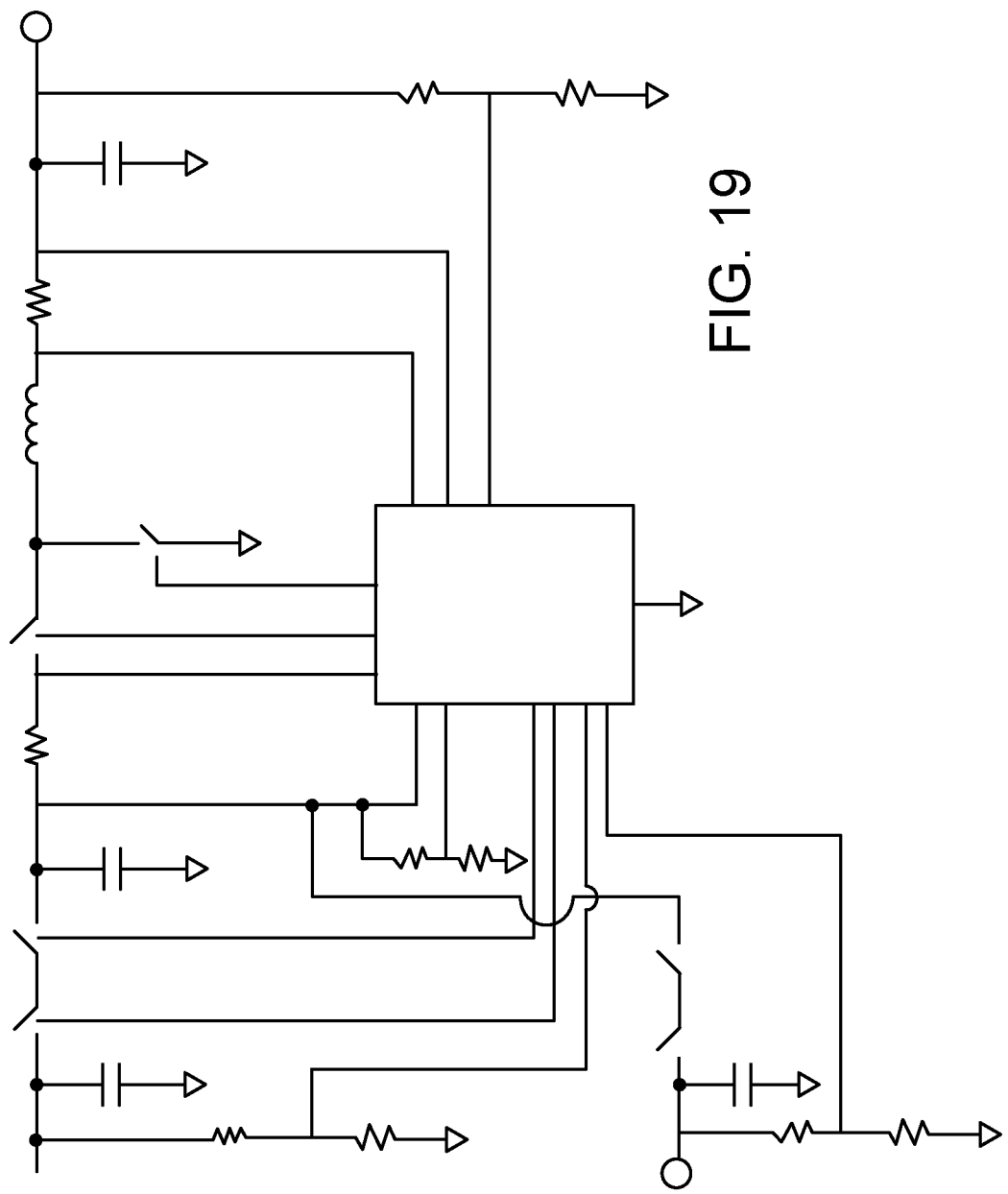
FIG. 19 illustrates an embodiment in which to input source protection bucking in an interleaving embodiment.

FIG. 19 illustrates an embodiment in which to input source protection bucking in an interleaving embodiment. FIGS. 17 and 19 allow either two input source protection bucking.

Figure 20:
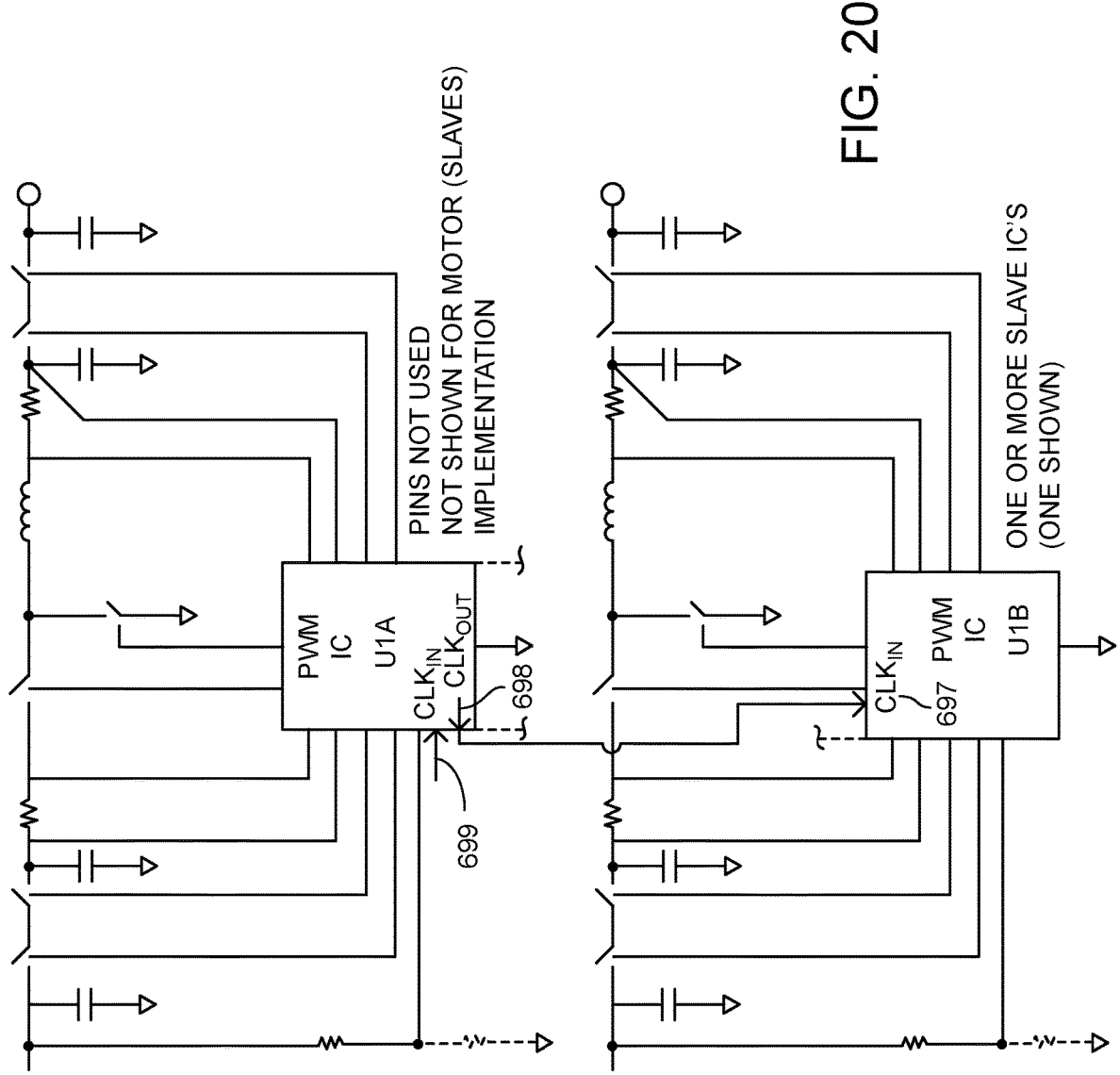
FIG. 20 shows an embodiment in which at least one IC is provided and wherein a plurality of ICs are interleaved.

FIG. 20 shows an embodiment in which at least one IC is provided and wherein a plurality of ICs are interleaved. FIG. 20 shows two or more, N phases, ganged ICs that are interleaved. When phasing means 697,698,699 are included, then interleaving of the low cost opposed quadrant IC can be realized. This structure can be realized as a single IC that provides all functions in one IC. This is releasable but is not focused on, as this becomes a complex IC.

Figure 21:
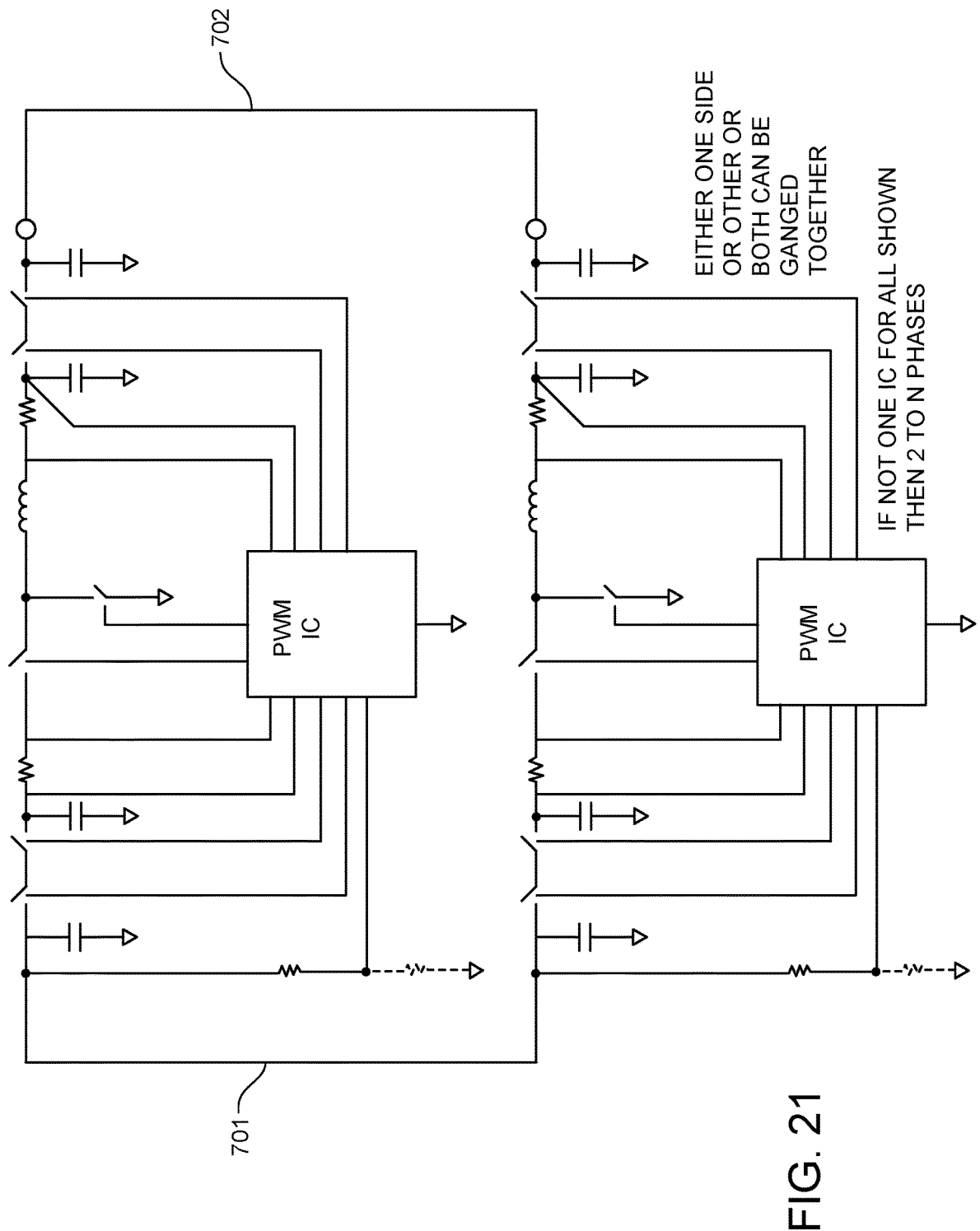
FIGS. 21 through 23 illustrate additional embodiments beyond that of FIG. 20 for connecting to converters at different nodes.
Figure 22:
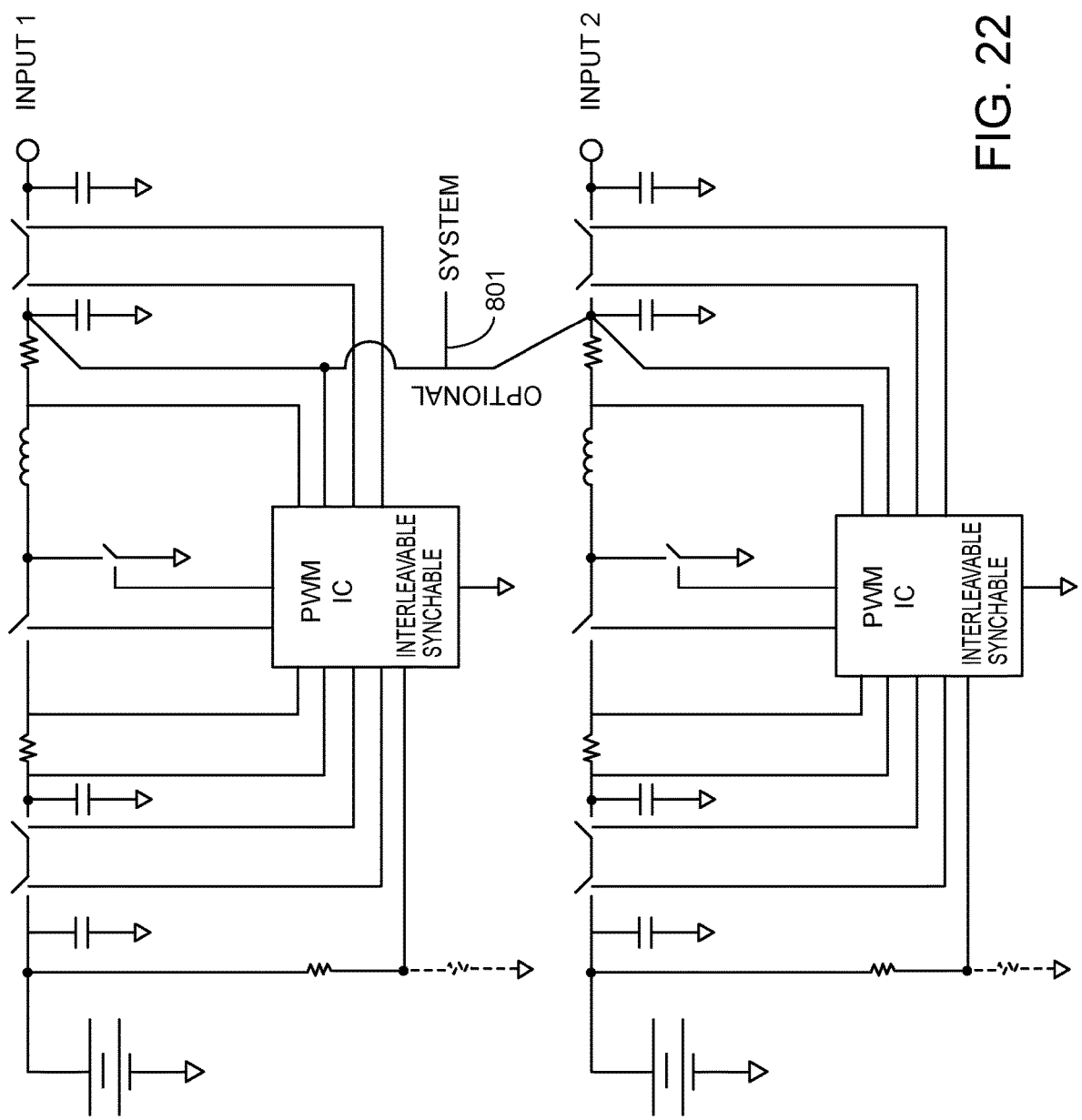
Figure 23:
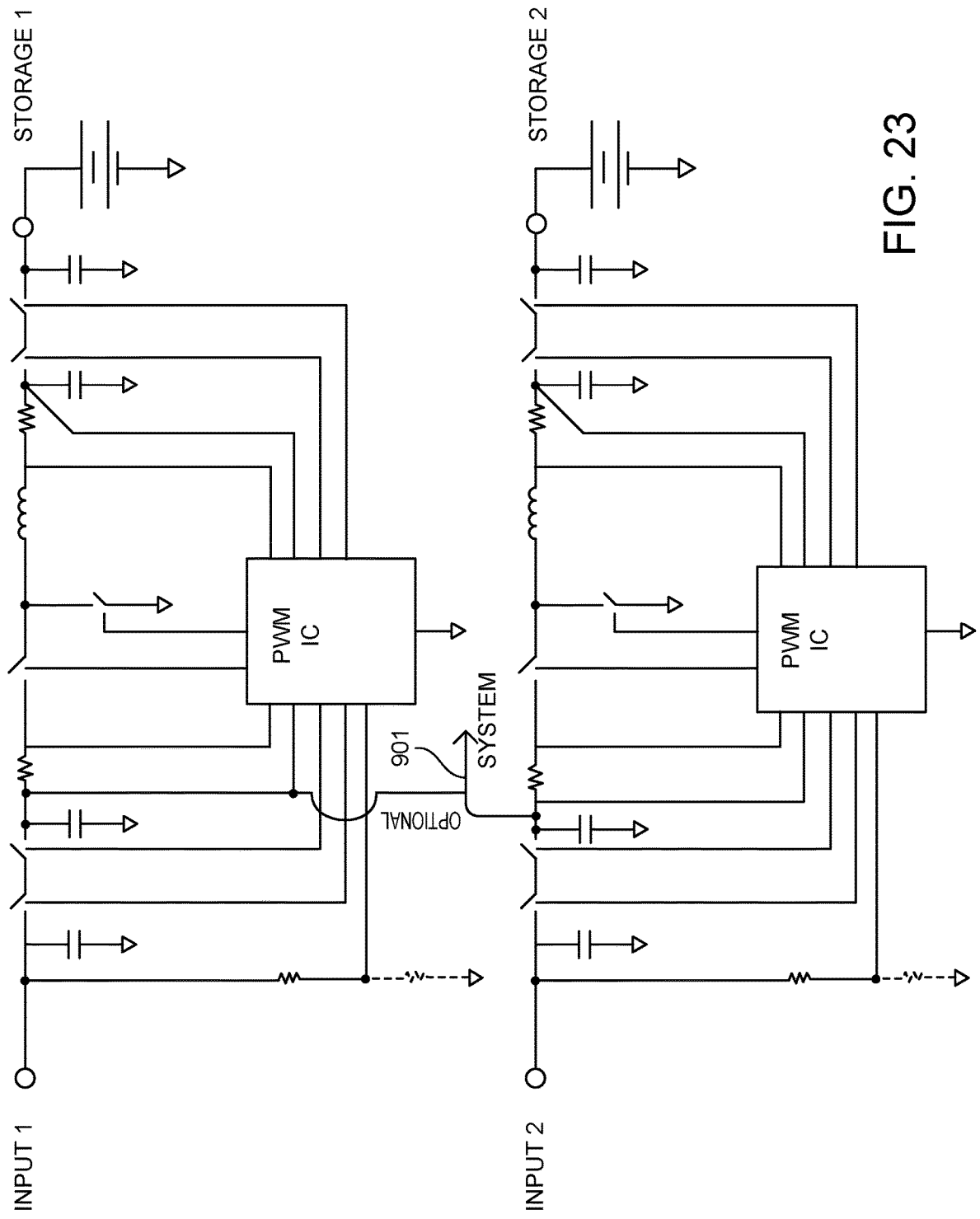

FIGS. 21 through 23 illustrate additional embodiments beyond that of FIG. 20 for connecting to converters at different nodes. FIGS. 20 through 23 show various options for connecting the two converters at different nodes for different topologies. FIG. 21 shows ganged inputs and outputs 701,702 for increasing power in and out. FIG. 22 shows ganged system rails 801 for increasing system load power capabilities. FIG. 23 shows ganged system rails 901 for increasing system load power capabilities.

Figure 24:
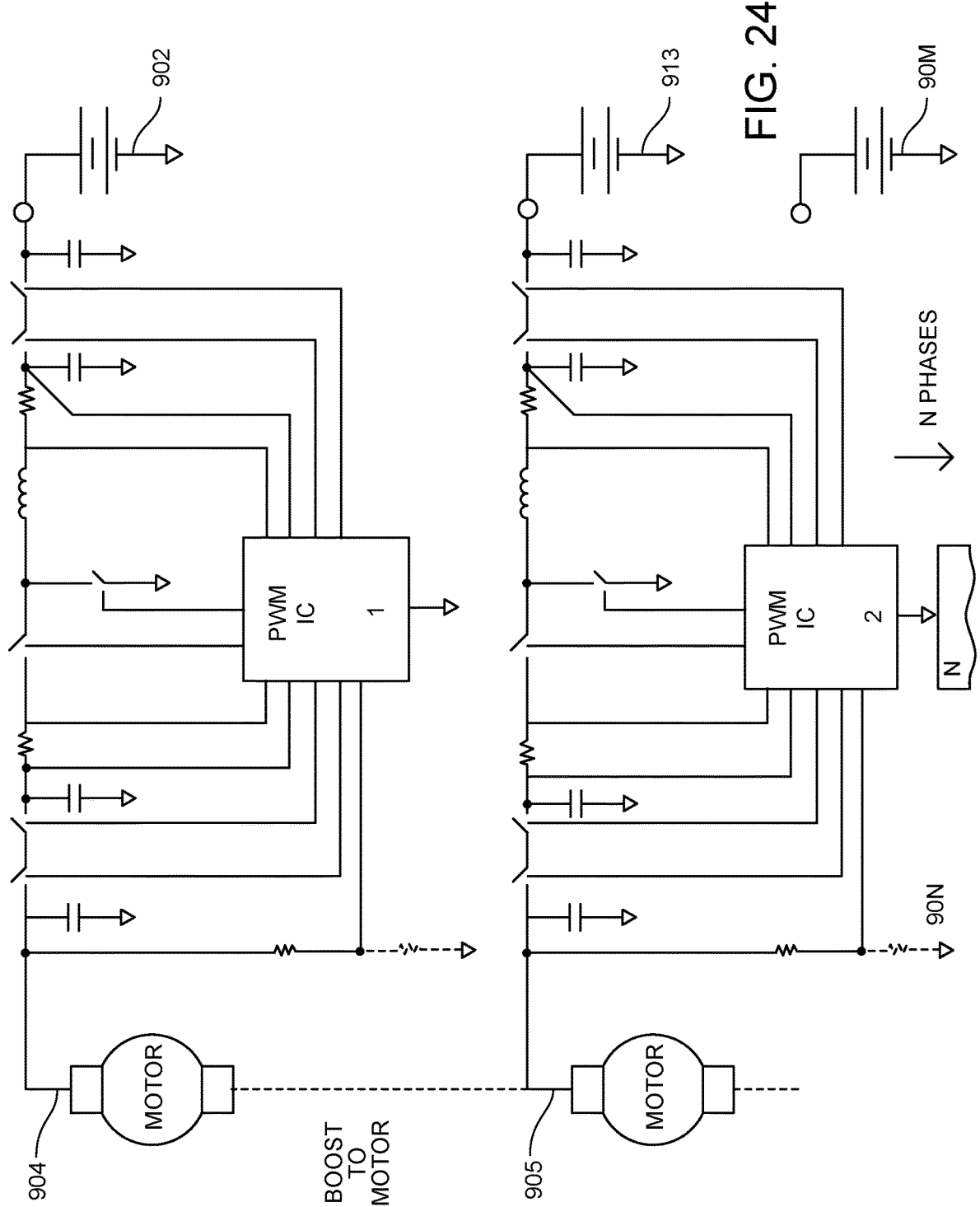
FIGS. 24 to 27 each describe a topology embodiment with an opposed two quadrant converter in conjunction with two bidirectional switches.
Figure 25:
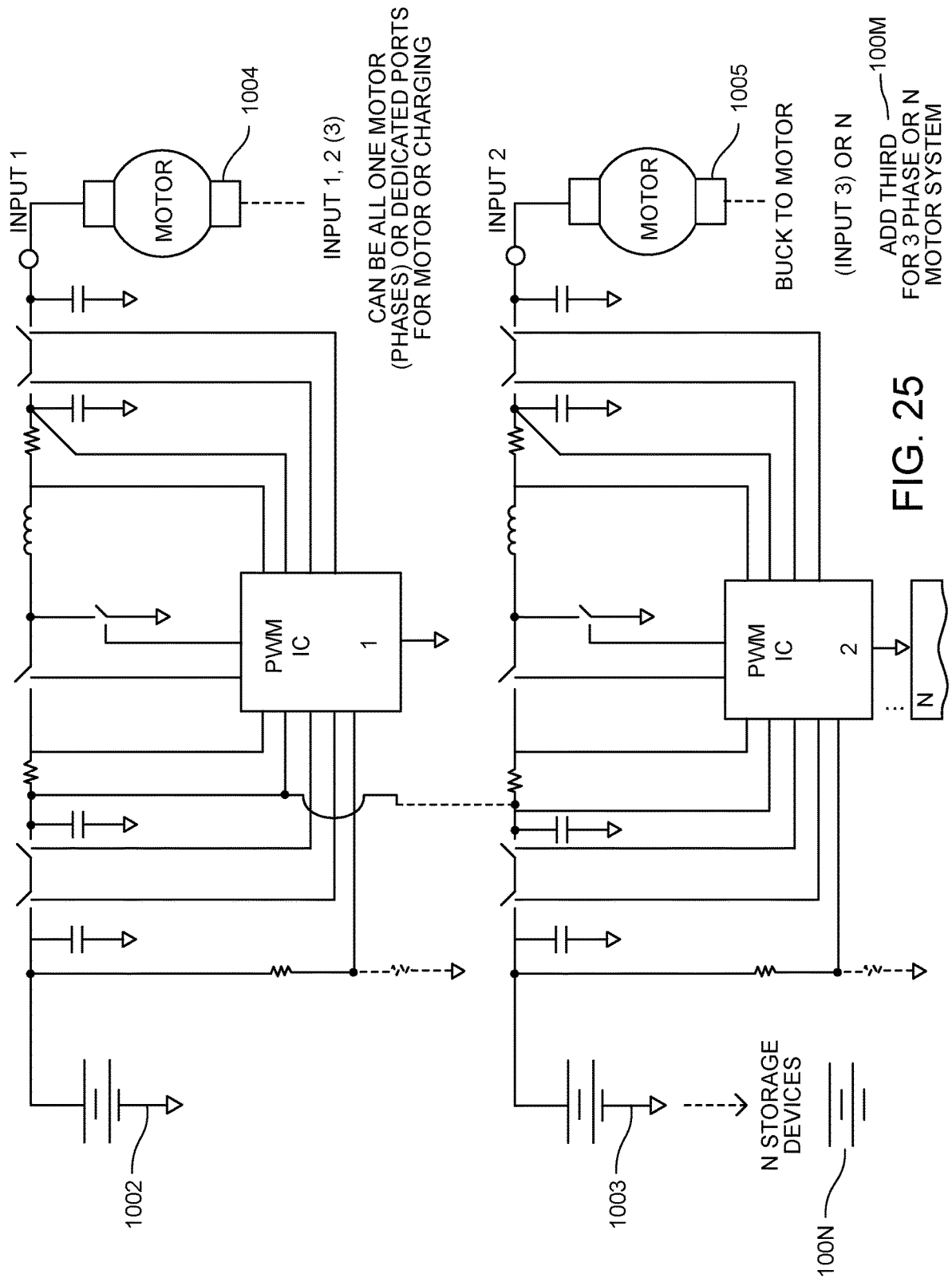
Figure 26:
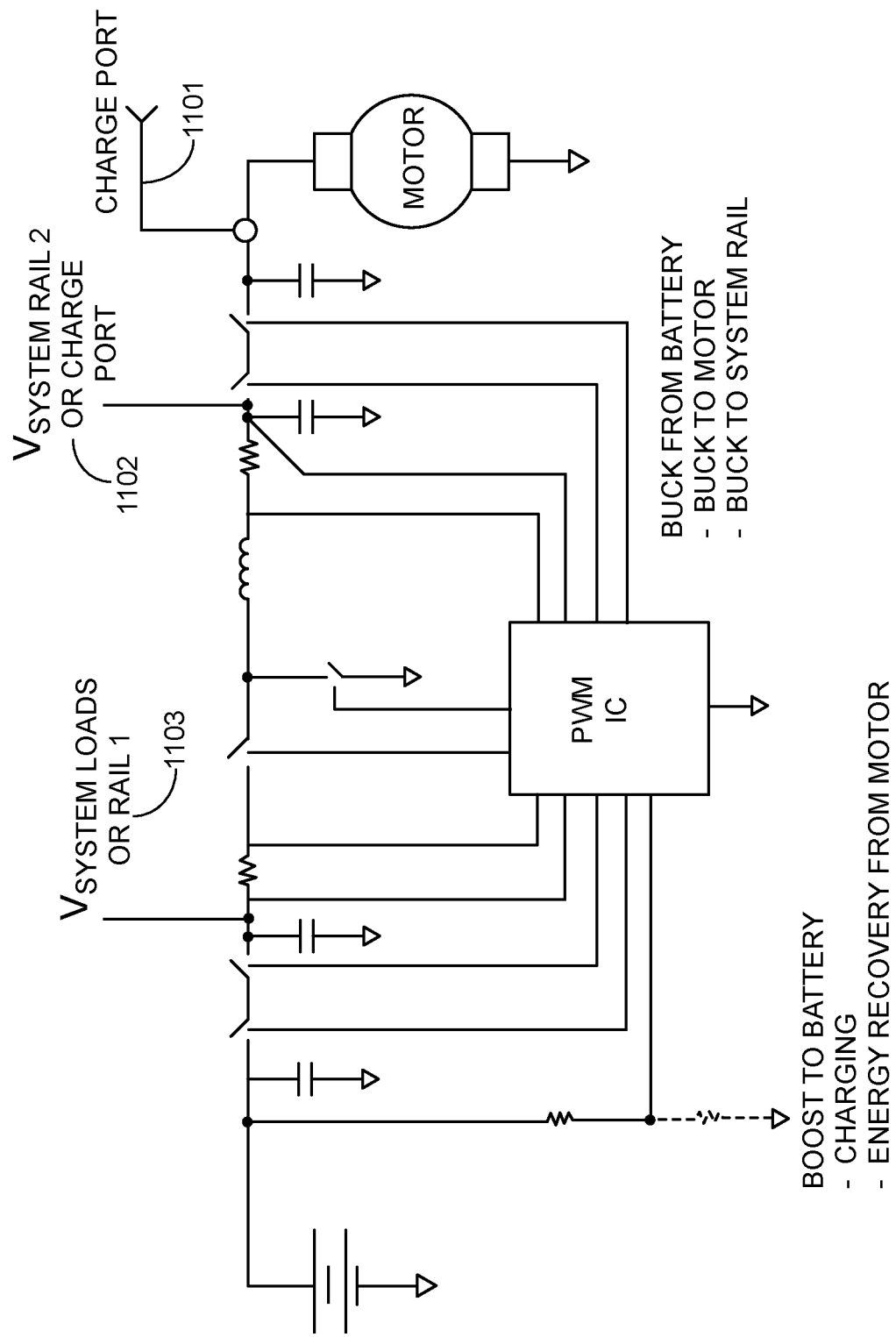
Figure 27:
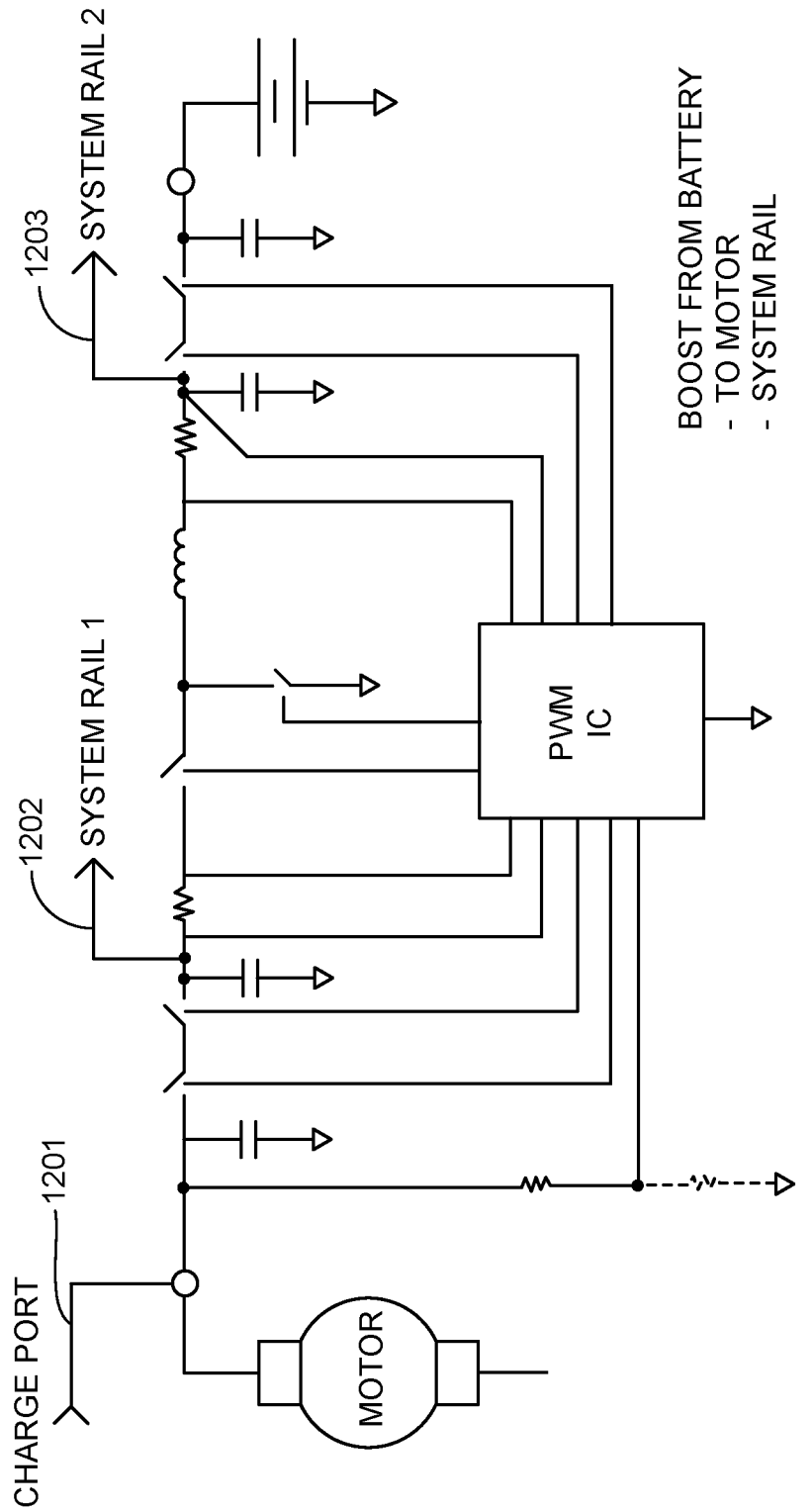

FIGS. 24 to 27 each describe a topology embodiment with an opposed two quadrant converter in conjunction with two bidirectional switches. FIG. 24 shows a boost to motor implementation, redundant or interleaved storage devices 902, 913, 90M and redundant or interleaved motors 904, 905, and 90N. FIG. 25 shows a buck to motor topology, with more than one motor or motor phase. FIG. 25 shows a buck to motor implementation, with redundant or interleaved storage devices 1002, 1003, 100N and redundant or interleaved motors 1004, 1005, and 100M. FIGS. 24 and 25 extends to M (or N) motors and N energy storage devices with N phases provided by phased ICs by extension and number of phases allowed by IC. FIG. 26 shows a single buck to single motor boost from generator to energy storage topology with possible system rails 1102 and 1103. And charge port 1101. FIG. 27 shows a single boost to single motor, single buck from generator to energy storage topology with possible system rails 1202 and 1203 and charge port 1201.

Figure 28:
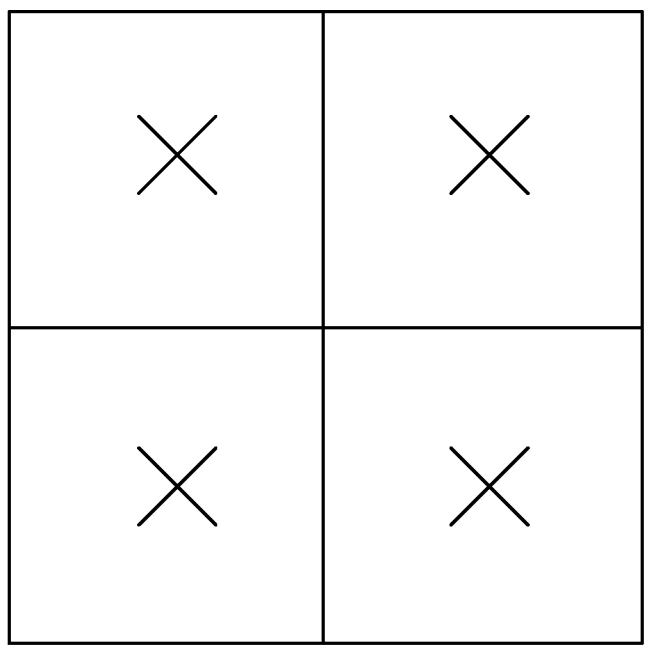
FIG. 28 and FIG. 29 each disclose a four quadrant converter with a different embodiment of protection switching.
Figure 29:
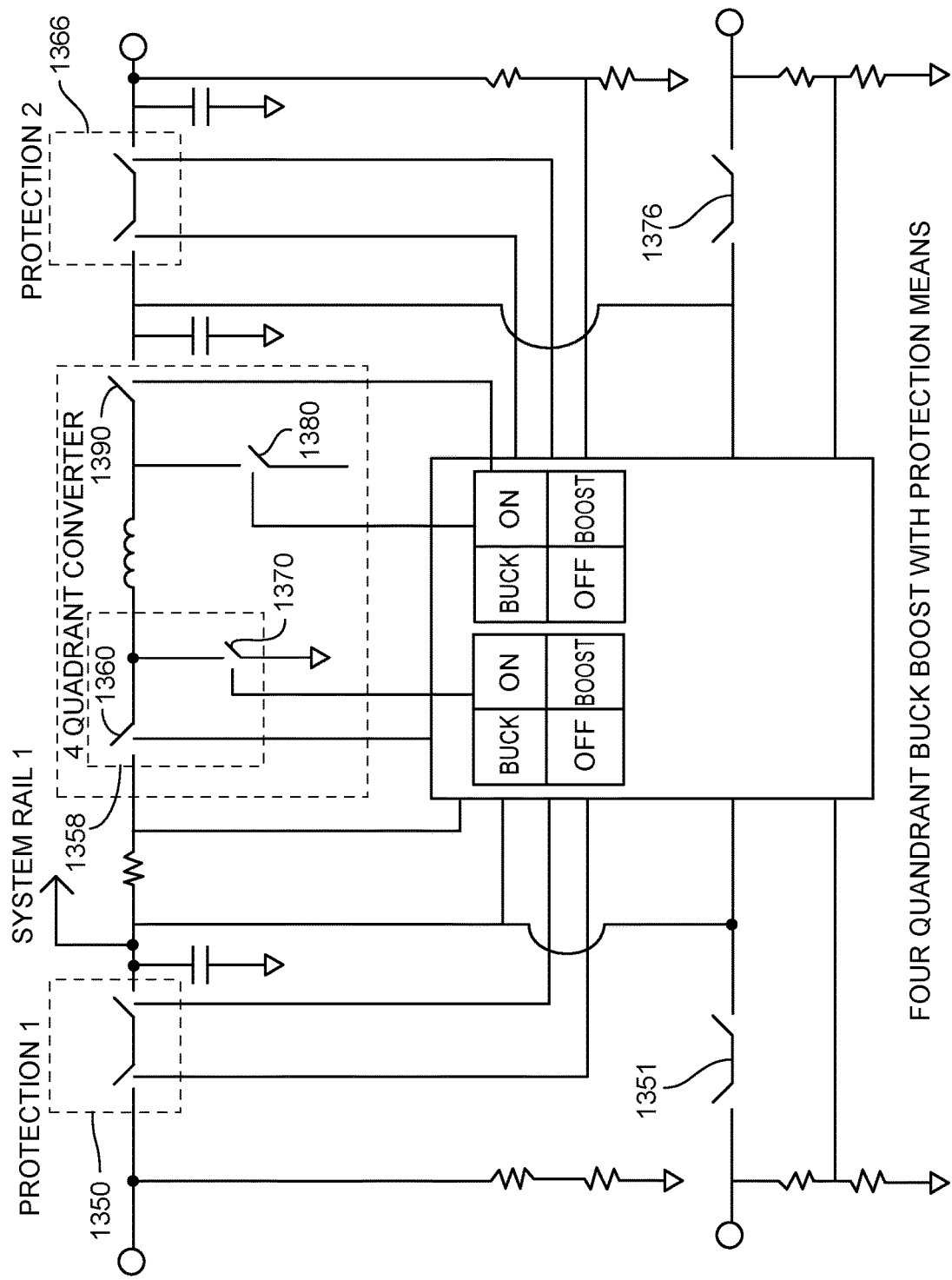

FIG. 28 and FIG. 29 each disclose a four quadrant converter with a different embodiment of protection switching. Redundancy implementation comprises two or more ICs or one more complex IC. Interleaving implementation comprises two or more ICs or one more complex IC. Both ends have sourcing and sinking capabilities, such as an energy storage device and a motor/generator. In FIG. 29, a four quadrant buck-boost DC/DC converter, either one dedicated IC design or two opposed two quadrant converters form a four quadrant converter.

Figure 30:
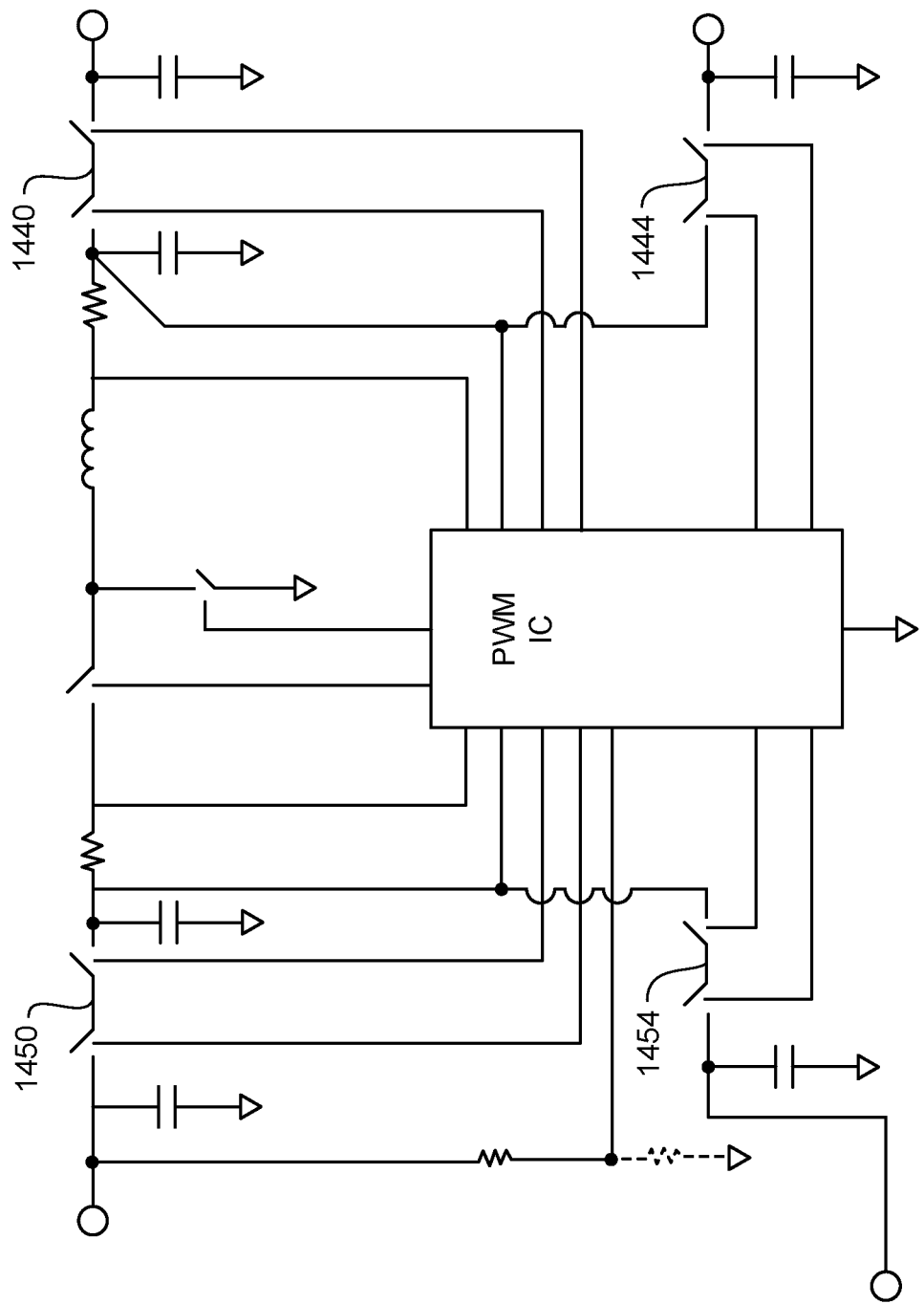
FIG. 30 discloses an embodiment with redundant protection at both the bus voltage and energy storage voltage sides.

FIG. 30 discloses an embodiment with redundant protection at both the bus voltage and an energy storage voltage side. Redundant input protection and output protection is provided at 1450,1440,1454, and 1444. One or more input or output switches can be repurposed to the other side. FIG. 30 shows switches moved to either input or output. Four inputs or outputs can be protected, or 3 inputs/outputs can be protected with one output/input protection switch when protection switches can be referenced to either side.

Figure 31:
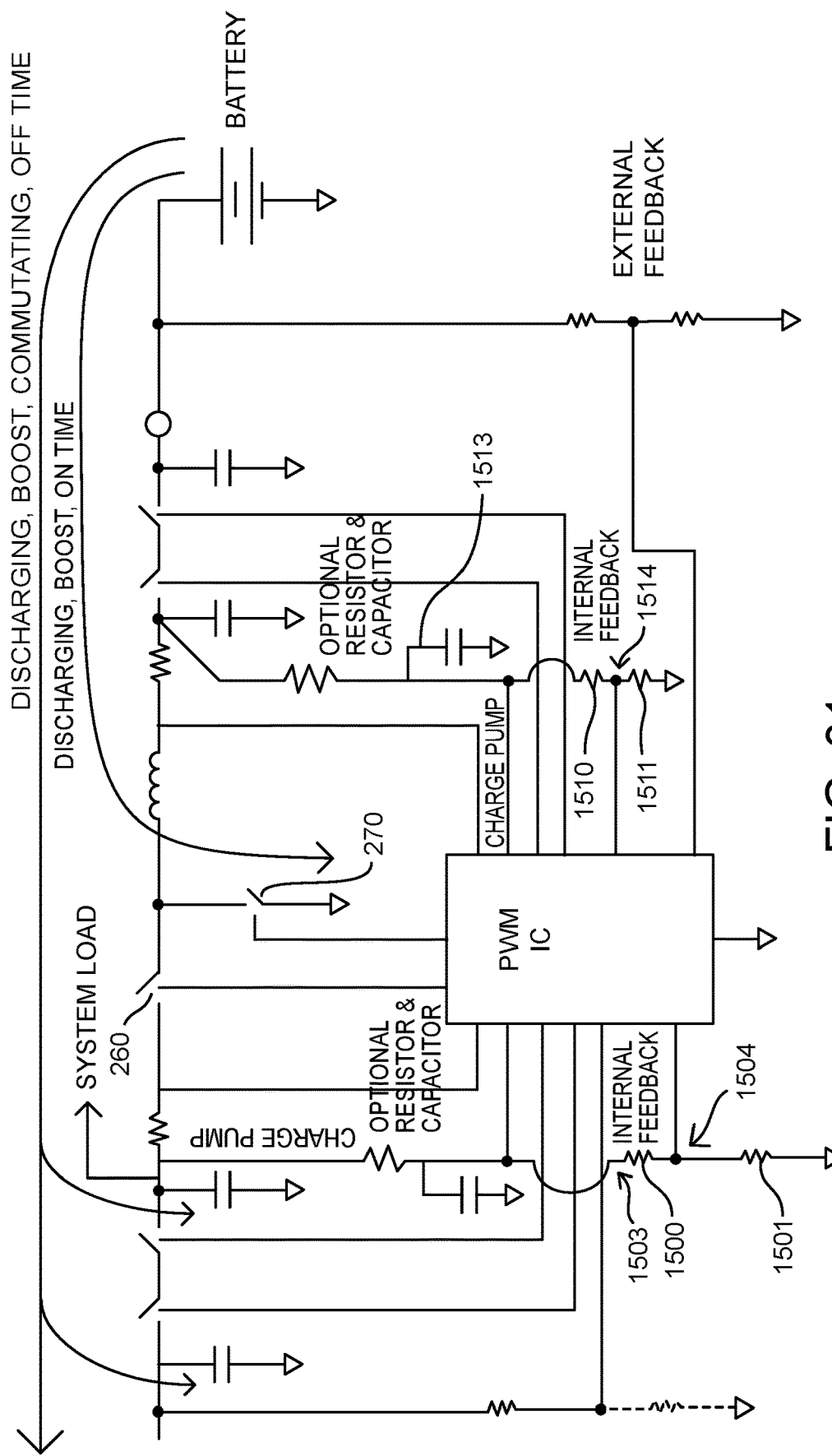
FIG. 31 illustrates an embodiment with internal feedback on either side of the PWM/PFM section.
Figure 32:
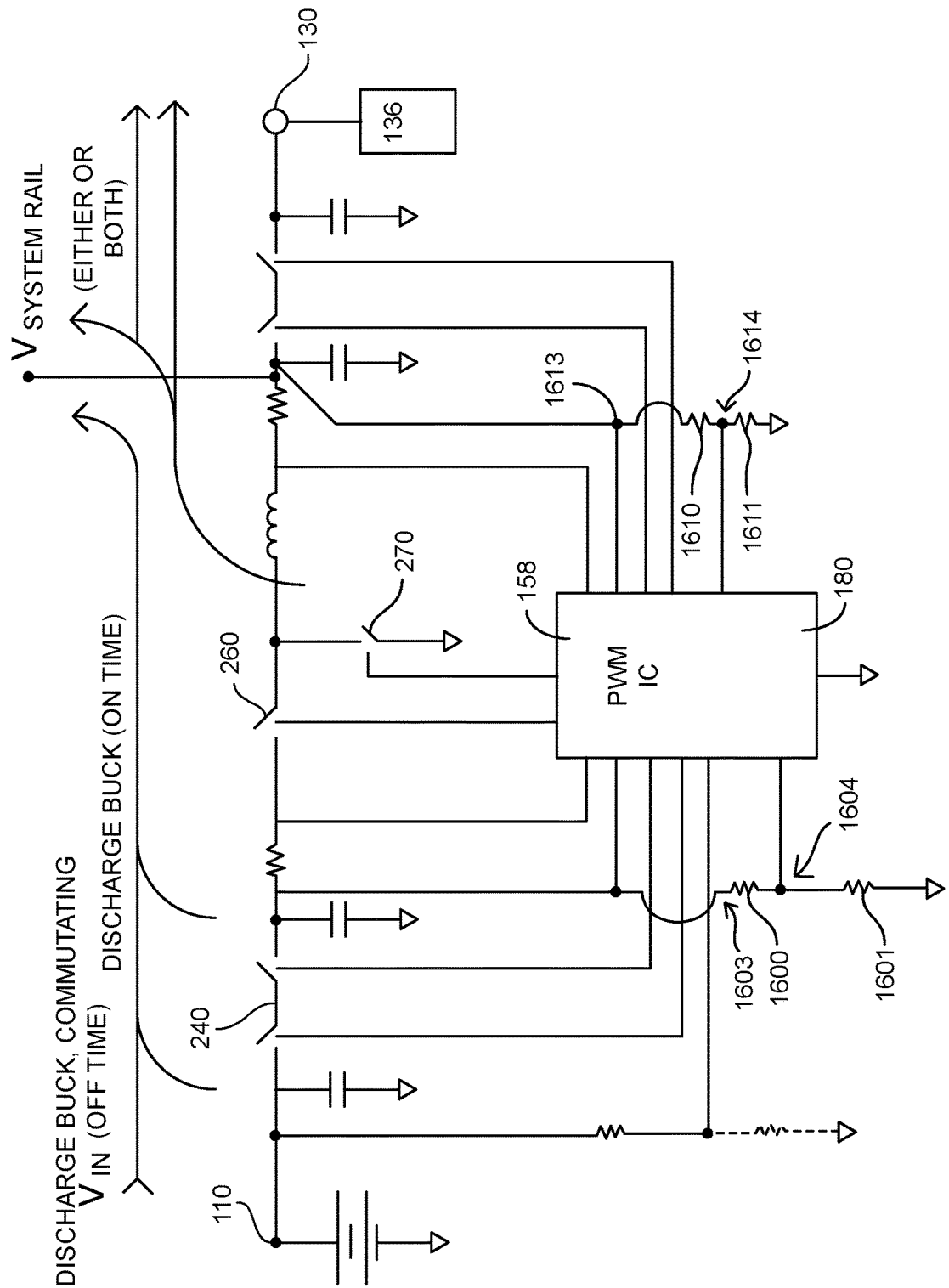
FIG. 32 illustrates an embodiment in which higher voltage levels may be used.

FIG. 31 illustrates an embodiment in which internal feedback on either side of the PWM/PFM section is responded to. FIG. 32 illustrates an embodiment in which higher voltage levels may be used. Internal feedback inside of the protection switches on both sides of PWM/PFM section is needed for proper control loop operation. In FIG. 2, components 154, 158 160 and 162 serve this purpose. FIG. 31 shows this numbered as well illustrating components 1500, 1501, 1503, 1504, 1510, 1511, 1513, and 1514. FIG. 32 shows this numbered as well at 1600, 1601, 1603, 1604, 1610, 1611, 1613, and 1614. These nodes are low voltage and thus cannot be hot wired to any internal or external node on power bus. Although the charge pump inputs could be used for feedback, this would limit the voltage withstand of the entire system because of internal voltage withstand IC limitations. Thus this provides the system the ability to run at higher voltage levels on the bus, as well as improved voltage withstand of any transients. Additional withstand of the charge pump section of the IC is achieved by insertion of RC filter for transients shown in FIG. 31 at 1550, 1551, 1560, and 1561.

The invention is not limited to the specific embodiments described above. Those of ordinary skill in the art will recognize that the invention is not limited to the embodiments described, but can be practiced with modification and alteration within the spirit and scope of the claims. Various modifications and changes may be made thereto without departing from the broader spirit and scope of the present invention. The present specification and figures are accordingly to be regarded as illustrative rather than restrictive. The description is not intended to be exhaustive or to limit the present invention to the precise forms disclosed.

Note to FIG. 9:
Both FIGS. 9 & 12 are source agnostic drawings.
For energy storage applications the energy storage can be left or right and input sources on the other side.

Note to FIG. 12:
Both FIGS. 9 & 12 are source agnostic drawings.
For energy storage applications the energy storage can be left or right and input source on the other side.

Note to FIG. 3:
FIG. 1A chosen not to confuse numbered to reference to existing numbers renumbered as needed Note to FIG. 14:
Applies to FIGS. 7, 11 (9, 12 generalized)

Note to FIG. 15:
Applies to FIGS. 8, 10 (9, 12 generalized)
Now adds same configuration different quadrant operation Note to FIG. 17:
If IC is designed such that:
the two protection switches (dual or single switches) can be referred to either side this allows:

(1) Ability for switches to be only on one side or one switching means on both sides as described in basic example (2) This allows one IC to have redundant energy storage for device control with one or other or both be connected to system and PWM inner block (3) This can be Buck referred (right in this drawing) or Boost (referred as shown here) Buck and Boost here are relevant terms and need energy storage and inputs sides chosen. This is left off this sketch to highlight the flexibility Note to FIG. 18:
Protection switches referred to same side for dual inputs or dual outputs depending on configuration chosen when either input or output protection is not needed or dual input or output protection is needed then switches are repurposed to one side for input or output selection or dual protection of a of source, load, or energy storage device or devices ① Buck to dual energy storage from single input (Boost to Hv system rail)

② Boost from one of energy storage devices and/or from both energy storage devices (Buck from input (left) to either of both energy storage devices.

Note to FIG. 19:
Protection switches referred to one side for dual inputs or outputs depending on configuration when input or output protection or input or output selection of source, load, or energy storage ① Boost to [energy storage (=left)]
Buck to system or low voltage rail
or
② Dual input sources capable, Buck to single energy storage Note to FIG. 20:
Most complex IC
(1) All in one IC (1a and 1b one IC)
(2) or two ICs
(A) For a system that needed all of the functionality one IC would be cheapest overall
(B) Market for such IC would be smaller so and if not large enough to warrant manufacturing then two IC would allow to be realized if two IC then
(B1) interleaving phased operation with a master and n slaves
(B2) redundancy if designed with over 200% (N00%) capacity system can lose a phase or redundant supply and continue to operate and provide load with power
(B3) with a common bus between 1A and 1B, either Boost side or Buck side referred allows for 2 independent inputs ( ) and for 2 independent outputs.

Note to FIG. 24:
Add third phase 120° apart for 3 phase (possible to have motor synchronized to PWM with less output caps
But has size implications for some capacitive and resistive elements Note to FIG. 30:
Fully redundant protection, input and output Note to FIG. 31:
charge pump can be further protected from HV spike energy and transient as IC spacing limit voltage withstand as well as internal nodes and coupling to other internal nodes
internal feedback

The invention claimed is:
1. An opposed two quadrant buck then boost DC/DC converter comprising:
   a. a single integrated circuit comprising a buck-boost DC/DC converter;

b. a bus terminal comprising a first input terminal for bus voltage and an energy storage terminal comprising a second input terminal for connection to an energy storage load;

c. a series circuit coupled between said bus terminal and said energy storage terminal comprising a first protection transistor, a first current sensor, a duty cycle circuit, an inductor, a second current sensor, and a second protection transistor;

d. said duty cycle circuit comprising a buck transistor and a boost transistor, said buck transistor comprising a buck transistor series path being connected in series between said bus terminal and said inductor and a said boost transistor comprising a boost transistor series path being connected in series between said inductor and a driver circuit;

e. said boost transistor being coupled to commutate said buck transistor in the buck mode and said buck transistor being coupled to commutate said boost transistor in the boost mode;

f. a system control circuit responsive to bus inputs and voltages and to currents from said energy storage load, said control circuit providing error signals indicative of status of the DC/DC converter to command selectively the buck mode or the boost mode; and g. said driver circuit being coupled to control said buck transistor and said boost transistor in response to signals from said system control circuit.

2. The opposed two quadrant buck then boost DC/DC converter according to claim 1 further comprising a first current sense amplifier coupled to amplify an output of said first current sensor and providing a first current input to said system control circuit and a second current sense amplifier coupled to amplify an output of said second current sensor and providing a second current input to said system control circuit.

3. The opposed two quadrant buck then boost DC/DC converter according to claim 2 further comprising a boost path from said inductor to said bus terminal to provide a path for stored energy from within said inductor to said bus terminal, the stored energy from within said inductor being coupled to add voltage to a voltage level at said bus terminal.

4. The opposed two quadrant buck then boost DC/DC converter according to claim 3 further comprising a first voltage loop measuring said bus voltage and providing an input indicative of said bus voltage to said system control circuit for comparison to a selected bus voltage level and a second voltage loop measuring potential at said energy storage terminal and providing an input indicative of the potential at said energy storage terminal to said system control circuit for comparison to a current voltage drop across said bus terminals.

5. The opposed two quadrant buck then boost DC/DC converter according to claim 4 wherein said control circuit responds to command the buck mode or the boost mode in response to said voltage loop measurements.

6. The opposed two quadrant buck then boost DC/DC converter according to claim 5 wherein said driver circuit responds to said system control circuit to forward bias said buck transistor and couple a first frequency commanded by said system control circuit to define a buck mode duty cycle.

7. The opposed two quadrant buck then boost DC/DC converter according to claim 6 wherein said driver circuit responds to said system control circuit to forward bias said boost transistor and couple a second frequency commanded by said system control circuit to define a boost mode duty cycle.

8. An opposed two quadrant buck then boost circuit in an integrated circuit, said integrated circuit comprising:

a. a first pair of terminals for connection across a bus voltage;

b. a second pair of terminals for connection across a storage load;

c. a sensing circuit and a system control circuit, said sensing circuit being responsive to a decrease of bus voltage level to produce a low voltage signal in response to the decrease of bus voltage to a voltage lower than a first, preselected bus voltage level, said sensing circuit providing the low voltage signal to said system control circuit; the system control circuit responding to the low voltage signal to command a boost mode;

d. the sensing circuit being coupled to produce a buck command signal in response to a return of bus voltage to at least the first, preselected bus voltage level, the buck command signal being coupled to the system control circuit to command the buck mode;

e. a driver circuit coupled to respond to commands from said system control circuit;

f. a buck and boost control circuit and an inductor coupled in series in a positive rail between said first pair of terminals and said second pair of terminals, said inductor being charged to store energy in a first portion of a duty cycle and to discharge energy in a remaining portion of the duty cycle;

g. said buck and boost control circuit comprising a buck transistor and a boost transistor, said buck transistor having a source-drain circuit in series in said positive rail and said boost transistor having a source-drain circuit in series between a terminal of said inductor and a ground terminal; and h. a gate of said buck transistor coupled for commutation by said boost transistor in a buck mode and a gate of said boost transistor coupled for commutation by said buck transistor in a boost mode.

9. The opposed two quadrant buck then boost DC/DC converter according to claim 8 wherein said system control circuit is coupled to respond to measurements of buck voltage to select a buck duty cycle for said buck transistor to maintain a preselected storage load voltage in the buck mode and wherein said system control circuit is coupled to respond to measurements of bus to select a boost duty cycle for said boost transistor to maintain a preselected bus voltage level in the boost mode.

10. The opposed two quadrant buck then boost DC/DC converter according to claim 9 further comprising a first protection transistor coupled between said bus terminal and a first side of said positive rail and a second protection transistor coupled between said energy source or sink terminal and an opposite end of said positive rail.

11. The opposed two quadrant buck then boost DC/DC converter according to claim 10 further comprising a first passive input filter across said bus terminal and ground to absorb transients and overvoltages coupled to said first protection transistor.

12. The opposed two quadrant buck then boost DC/DC converter according to claim 11 further comprising a second passive input filter across said energy storage terminal and ground to absorb current due to transients created by switching and overvoltages coupled to said second set protection transistor.

13. The opposed two quadrant buck then boost DC/DC converter according to claim 12 further comprising a first overvoltage sensing circuit to bias said first protection transistor to a nonconductive state in response to application of voltages to said bias terminal in excess of a first protection transistor preselected threshold.

14. The opposed two quadrant buck then boost DC/DC converter according to claim 13 further comprising a second overvoltage sensing circuit to bias said second protection transistor to a nonconductive state in response to application of voltages to said energy storage terminal in excess of a second protection transistor preselected threshold.

15. The opposed two quadrant buck then boost DC/DC converter according to claim 12 further comprising a charging capacitor coupled between said bus terminal and ground for absorbing voltage inrush from said bus terminal.

16. The opposed two quadrant buck then boost DC/DC converter according to claim 8 wherein said buck and boost control circuit provides a current path to facilitate hot switching across the bus terminals in transitioning from the boost mode to the buck mode.

17. A four quadrant buck-boost DC/DC converter in an integrated circuit, said integrated circuit comprising:
   a. a single integrated circuit comprising a buck-boost DC/DC converter;
   b. a bus terminal comprising a first input terminal for bus voltage and an energy storage terminal comprising a second input terminal for connection to an energy storage load;
   c. a series circuit coupled between said bus terminal and said energy storage terminal comprising a first protection transistor, a first current sensor, a duty cycle circuit, an inductor, a second current sensor, and a second protection transistor;
   d. said duty cycle circuit comprising a buck transistor and a boost transistor, said buck transistor comprising a buck transistor a series path being connected in series between said bus terminal and said inductor and a said boost transistor comprising a boost transistor series path being connected in series between said inductor and a driver circuit;
   e. said boost transistor being coupled to commutate said buck transistor in the buck mode and said buck transistor being coupled to commutate said boost transistor in the boost mode;
   f. a system control circuit responsive to bus inputs and voltages and to currents from said energy storage load, said control circuit providing error signals indicative of status of the DC/DC converter to command selectively the buck mode or the boost mode; and
   g. said driver circuit being coupled to control said buck transistor and said boost transistor in response to signals from said system control circuit.

18. The four quadrant buck-boost DC/DC converter according to claim 17 wherein said four quadrant converter comprises two opposed two quadrant converters.

19. The four quadrant buck-boost DC/DC converter according to claim 18 further comprising a first protection transistor coupled between said bus terminal and a first side of said positive rail and a second protection transistor coupled between said energy source terminal and an opposite end of said positive rail.

20. The four quadrant buck-boost DC/DC converter according to claim 19 further comprising a passive input filter across said energy storage terminal and ground to absorb current transients resulting from switching and overvoltages coupled to said second protection transistor.

* * * * *